(12) United States Patent
Karpowitz et al.

(10) Patent No.: US 12,053,343 B1
(45) Date of Patent: Aug. 6, 2024

(54) DENTAL DEVICE MANUFACTURING SYSTEM AND METHOD

(71) Applicant: MERIT CABOT, LLC, Scottsdale, AZ (US)

(72) Inventors: Cameron Karpowitz, San Clemente, CA (US); Cannon F. Allen, Jr., Omaha, NE (US); Dicken Smith, Holladay, UT (US)

(73) Assignee: MERIT CABOT, LLC, Scottsdale, AZ (US)

( * ) Notice: Subject to any disclaimer, the term of this patent is extended or adjusted under 35 U.S.C. 154(b) by 917 days.

(21) Appl. No.: 16/884,997

(22) Filed: May 27, 2020

Related U.S. Application Data

(60) Provisional application No. 62/853,309, filed on May 28, 2019.

(51) Int. Cl.
| | |
|---|---|
| *B33Y 50/00* | (2015.01) |
| *A61C 7/00* | (2006.01) |
| *A61C 7/08* | (2006.01) |
| *A61C 9/00* | (2006.01) |
| *B29C 51/26* | (2006.01) |
| *B29C 51/30* | (2006.01) |
| *G05B 19/18* | (2006.01) |
| *B33Y 80/00* | (2015.01) |

(52) U.S. Cl.
CPC ............... *A61C 7/002* (2013.01); *A61C 7/08* (2013.01); *A61C 9/004* (2013.01); *B29C 51/266* (2013.01); *B29C 51/30* (2013.01); *B33Y 50/00* (2014.12); *B33Y 80/00* (2014.12); *G05B 19/18* (2013.01)

(58) Field of Classification Search
CPC ........... A61C 7/002; A61C 7/08; A61C 9/004; B29C 51/266; B29C 51/30; B33Y 50/00; B33Y 80/00
See application file for complete search history.

(56) References Cited

U.S. PATENT DOCUMENTS

| | | | |
|---|---|---|---|
| 5,788,489 | A | 8/1998 | Huffman |
| 5,788,490 | A | 8/1998 | Huffman |
| 2002/0164556 | A1 | 11/2002 | Huffman |
| 2005/0106530 | A1 | 5/2005 | Huffman |
| 2006/0093992 | A1 | 5/2006 | Wen |
| 2006/0127851 | A1 | 6/2006 | Wen |
| 2006/0127853 | A1 | 6/2006 | Wen |
| 2006/0199153 | A1 | 10/2006 | Liu |

(Continued)

*Primary Examiner* — Yuhui R Pan
(74) *Attorney, Agent, or Firm* — The Small Patent Law Group LLC; Christopher R. Carroll

(57) ABSTRACT

A manufacturing system and method obtain a first digital model of teeth, create a modified digital model of the teeth by adding a locator feature to the first digital model of the teeth, and create a physical model of the teeth based on the modified digital model. A portion of the physical model is created based on the locator feature.

A dental aligner device is formed on the physical model of the teeth with extraneous material of the dental aligner device extending away from the dental aligner device. The extraneous material is removed from the dental aligner device from the physical model of the teeth. The forming of the dental aligner device and/or the removing of the extraneous material is performed by positioning the physical model using the locator feature.

19 Claims, 23 Drawing Sheets

(56) References Cited

U.S. PATENT DOCUMENTS

| | | | |
|---|---|---|---|
| 2008/0141534 A1* | 6/2008 | Hilliard | A61C 7/02 |
| | | | 29/896.11 |
| 2008/0318179 A1 | 12/2008 | Liu | |
| 2009/0286196 A1 | 11/2009 | Wen | |
| 2017/0100211 A1* | 4/2017 | Wen | A61C 7/002 |
| 2018/0263730 A1* | 9/2018 | Sirovskiy | A61C 7/08 |

* cited by examiner

DENTAL DEVICE MANUFACTURING SYSTEM AND METHOD

CROSS-REFERENCE TO RELATED APPLICATIONS

This application claims priority to U.S. Provisional Application No. 62/853,309, which was filed on 28 May 2019, and the entire disclosure of which is incorporated herein by reference.

FIELD

Embodiments of the subject matter described herein relate to dental devices, such as dental aligners, gumshields, retainers, and periodontal trays.

BACKGROUND

Dental aligner devices are mouthpieces that fit over a person's teeth to help move the teeth to desired positions and/or to keep the teeth in the desired positions. The aligner devices are custom-fit to a person's teeth, and a set of multiple aligner devices may be custom-fit and provided to a person to gradually move the person's teeth to the desired positions.

Some known aligner devices are manufactured by obtaining images (e.g., x-ray images, computed tomography (CT) scans, photographs, one or more three-dimensional scans, or the like), bite registrations, and/or impressions of a person's teeth. This information can be used to create a digital, three-dimensional (3D) representation of the teeth and surrounding soft tissue. Several additional, different representations of the teeth can be created, with each of these additional representations being a different arrangement of positions of the teeth (e.g., to gradually move the teeth to the desired positions). Several of the aligner devices can then be created based on these representations using stereolithography or another form of 3D printing. This manufacturing process can be time-consuming and expensive.

Additionally, some known aligner devices include extraneous material. This extraneous material may extend beyond cutting lines that define outer edges of the aligner devices. Failure to remove this extraneous material can result in the aligner device contacting additional areas inside the mouth of a wearer of the aligner device. This can cause discomfort to the wearer of the aligner device. Care must be provided in removing the extraneous material to avoid creating sharp tips or valleys in the aligner device, which also can create discomfort in the mouth of the wearer. As a result, at least some known aligner devices are formed by the extraneous material being manually removed by hand-cutting the extraneous material. This also can be a time-consuming and expensive process.

BRIEF DESCRIPTION

In one embodiment, a method includes obtaining a first digital model of teeth, creating a modified digital model of the teeth by adding a locator feature to the first digital model of the teeth, and creating a physical model of the teeth based on the modified digital model. A portion of the physical model is created based on the locator feature. The method also includes forming a dental aligner device on the physical model of the teeth with extraneous material of the dental aligner device extending away from the dental aligner device and removing the extraneous material from the dental aligner device from the physical model of the teeth. One or more of forming the dental aligner device or removing the extraneous material is performed by positioning the physical model during the forming the dental aligner device and/or removing the extraneous material using the locator feature.

In one embodiment, a manufacturing system includes one or more processors configured to obtain a first digital model of teeth and to create a modified digital model of the teeth by adding a locator feature to the first digital model of the teeth and a printing system configured to create a physical model of the teeth based on the modified digital model. A portion of the physical model is created based on the locator feature. The manufacturing system also includes a forming system configured to form a dental aligner device on the physical model of the teeth with extraneous material of the dental aligner device extending away from the dental aligner device and a milling system configured to remove the extraneous material from the dental aligner device from the physical model of the teeth. One or more of the forming system forms the dental aligner device or the milling system removes the extraneous material by positioning the physical model using the locator feature.

In one embodiment, a manufacturing system includes a computer-aided design (CAD) system configured to obtain a digital model of teeth. The CAD system is configured to add a locator feature to the digital model of the teeth. The manufacturing system also includes a 3D printing system configured to create a physical model of the teeth based on the digital model having the locator feature, a thermoforming system configured to form a dental aligner device on the physical model of the teeth with extraneous material of the dental aligner device extending away from the dental aligner device, and a milling system configured to remove the extraneous material from the dental aligner device from the physical model of the teeth. One or more of the thermoforming system is configured to form the dental aligner device or the milling system is configured to remove the extraneous material is performed by positioning the physical model during the forming the dental aligner device and/or removing the extraneous material using the locator feature.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the inventive subject matter described herein relate to manufacturing systems and methods for creating dental devices, such as dental aligners or dental aligner devices. Optionally, one or more embodiments of the systems and/or methods described herein can be used to manufacture other dental devices that are not used for changing a position of any tooth. For example, at least one embodiment of the inventive subject matter can be used to create mouthguards that protect teeth during activity, such as during play in a sport; gumshields; retainers; periodontal trays; and the like.

Figure 1:
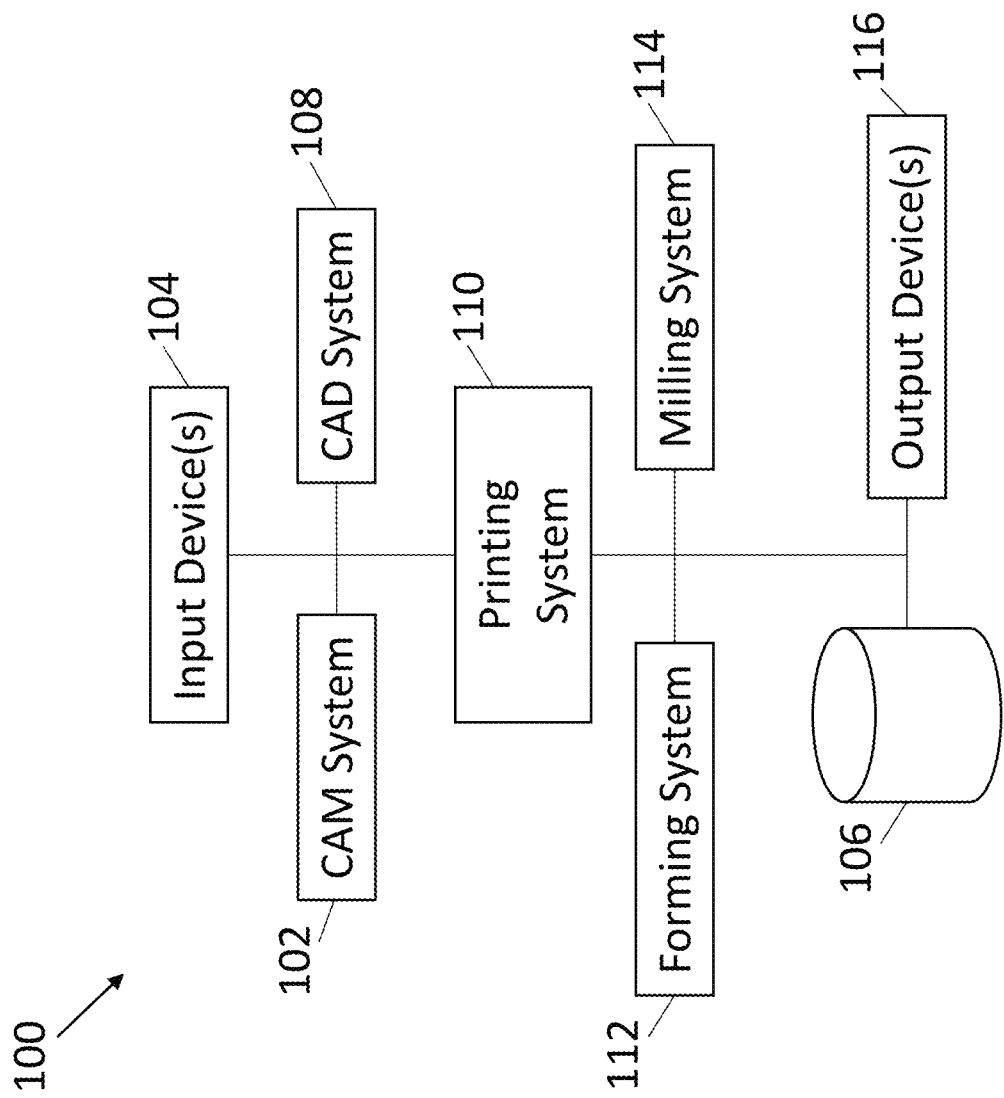
FIG. 1 schematically illustrates one embodiment of a dental device manufacturing system.

FIG. 1 schematically illustrates one embodiment of a dental device manufacturing system 100. The manufacturing system 100 includes a computer-aided design (CAD) system 108 that receives and/or creates digital models of sets of teeth. The CAD system 108 can represent hardware circuitry that includes and/or is connected with one or more processors (e.g., one or more microprocessors, integrated circuits, field programmable gate arrays, controllers, etc.) that control or perform the functions described in connection with the CAD system 108. Connections between the components of the manufacturing system 100 that are shown in FIG. 1 can represent wired and/or wireless connections. Optionally, one or more of these connections may represent that information is passed or conveyed between the components without the components being connected by wired and/or wireless connections. For example, a connection can indicate that a part (e.g., a physical model or dental aligner device) is moved between components, that information is output by one component and input to another component by a user of the manufacturing system 100, or the like.

The CAD system 108 can receive a 3D digital model of a set of teeth of a person from one or more input devices 104. These input devices 104 can be communication devices (e.g., transceiving hardware, such as modems, that communicate data via one or more computer networks), electronic devices (e.g., an electronic mouse, keyboard, stylus, etc.), or the like.

Figure 2:
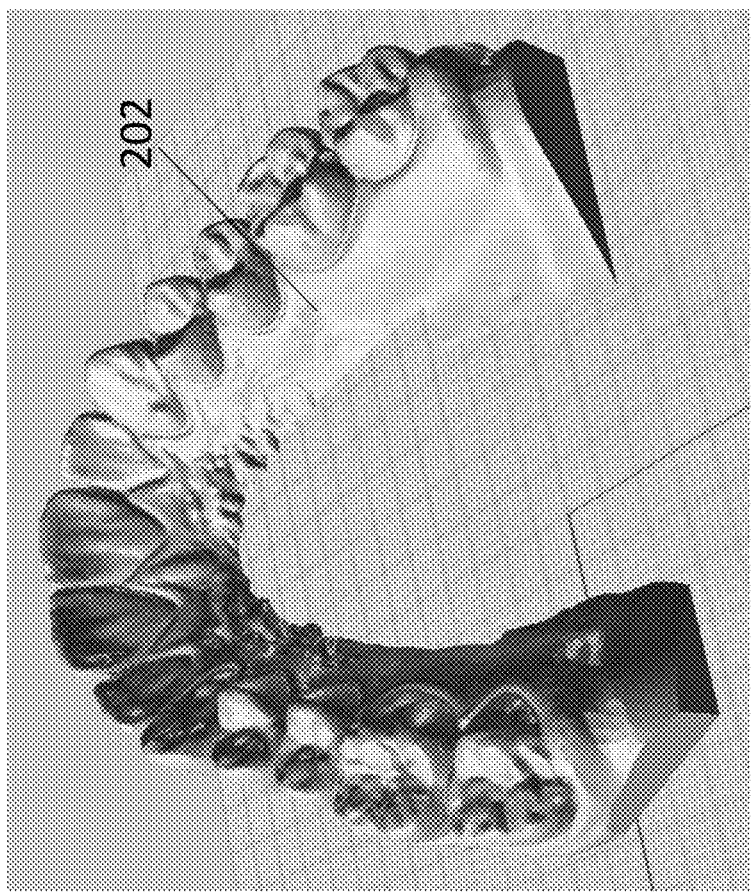
FIG. 2 illustrates one example of a rendered image of a 3D digital model of a set of teeth.

FIG. 2 illustrates one example of a rendered image 200 of a 3D digital model 202 of a set of teeth. This image 200 provides a perspective view of the digital model 202 with the teeth in one position. The data forming the digital model 202 can be stored in a tangible and non-transitory computer-readable storage medium or memory 106 (shown in FIG. 1), such as a computer hard drive, removable flash drive, server, cloud storage system, or the like, that is accessible by the CAD system 108 and optionally the input device 104.

The digital model 202 is modified to include a locator keyway. For example, the data that represents the digital model 202 to the CAD system 108 can be modified so that the model 202 includes the locator keyway. The locator keyway is an additional part added to the digital model 202 or a volume of the digital model 202 that is removed from the digital model 202. The shape of the locator keyway is complimentary to a corresponding key that is used to hold a dental aligner device in position during subsequent manufacturing processes, as described herein.

Figure 3:
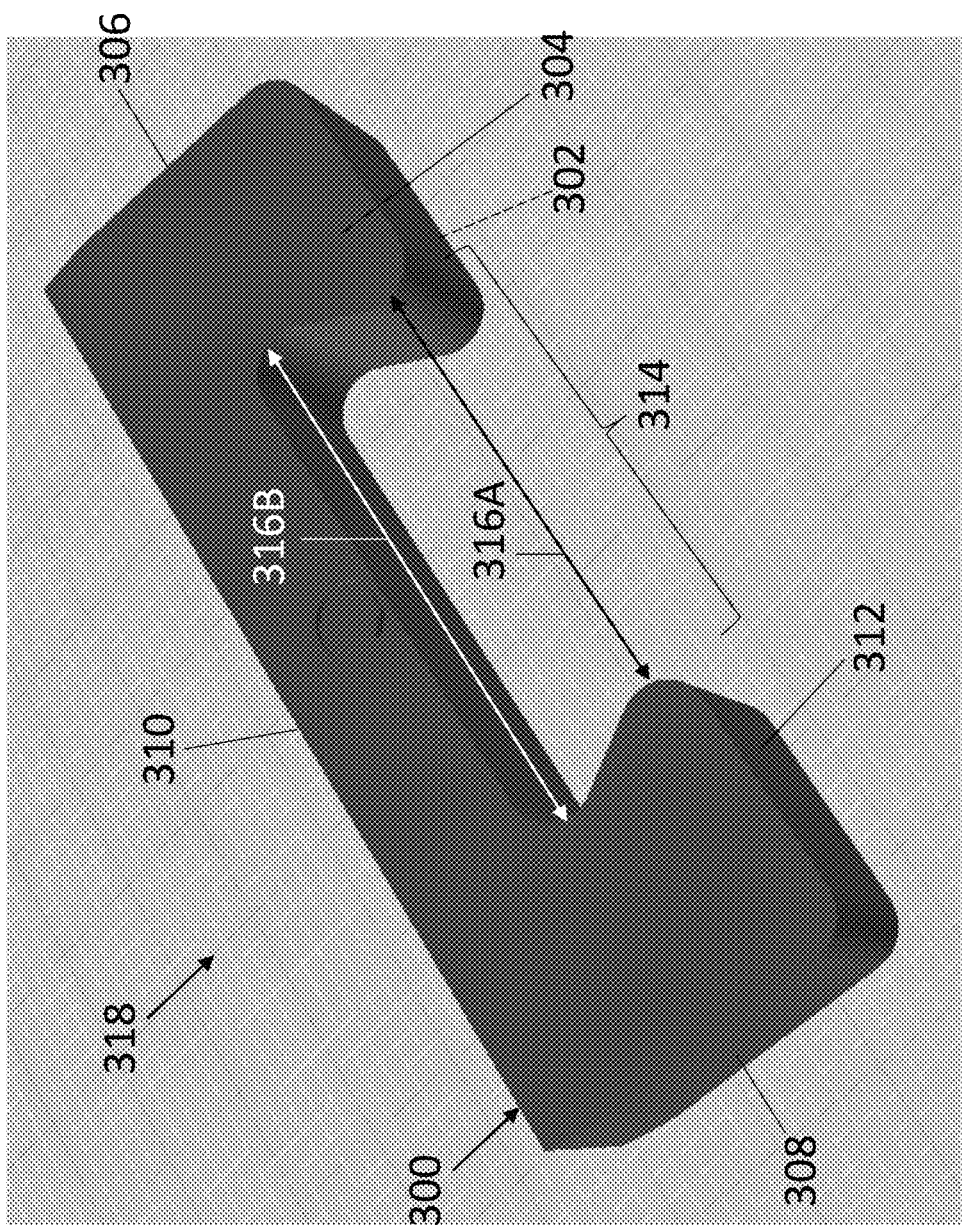
FIG. 3 illustrates one example of a rendered image of a locator keyway.

FIG. 3 illustrates one example of a rendered image 318 of a locator keyway 300. The locator keyway 300 can be a positive locator keyway 300 in that the locator keyway is to be added to the digital model(s) 200 of the teeth. Conversely, the locator keyway 300 can be a negative locator keyway that is a volume or void of space in a defined shape that is to be removed from the digital model(s) 200 of the teeth. For example, the locator keyway 300 shown in FIG. 3 can be a negative locator keyway if the volume encompassed by the locator keyway 300 is removed, rather than added to, the digital model(s) 200. Optionally, the locator keyway 300 can be a hybrid locator keyway that represents a volume of space that is to at least partially replace part of the digital model 202 and that is to be added to the digital model 202. For example, part of the space defined by the shape of the locator keyway 300 can replace part of the space defined by the shape of the digital model 202 and the remaining space defined by the shape of the locator keyway 300 can be added to the space defined by the remainder of the shape of the digital model 202. The data representing the locator keyway 300 and that is used by the CAD system 108 to combine the locator keyway 300 with the digital model 202 can be stored in the memory 106.

The locator keyway 300 extends between opposite superior and inferior planar boundaries 302, 304. These superior and inferior boundaries 302, 304 optionally can be non-planar. The superior and inferior boundaries 302, 304 are joined with each other by opposite left and right side edge boundaries 306, 308. The superior and inferior boundaries 302, 304 also are joined with each other by opposite anterior and posterior edge boundaries 310, 312. The boundaries 302, 304, 306, 308, 310, 312 are named based on the direction in which each boundary 302, 304, 306, 308, 310, 312 faces relative to the digital model 202 of teeth. For example, the superior boundary 302 faces upward toward the occlusal plane of the teeth represented by the digital model 202, the inferior boundary 304 faces downward away from the occlusal plane of the teeth represented by the digital model 202, the left boundary 306 faces to the left of the mouth that includes the teeth represented by the digital model 202, the right boundary 308 faces to the right of the mouth that includes the teeth represented by the digital model 202, the anterior boundary 310 faces the front of the mouth that includes the teeth represented by the digital model 202, and the posterior boundary 312 faces the back of the mouth that includes the teeth represented by the digital model 202.

The posterior edge boundary 312 forms a recess 314 that extends into the posterior edge boundary 312 toward the anterior edge boundary 310. This recess 314 is flared such that a width dimension 316A, 316B of the recess 314 is wider in locations that are farther from the posterior edge boundary 312 than in locations that are closer to the posterior edge boundary 312. This width dimension 316A, 316B can be measured in a direction that extends from the left edge boundary 306 to the right edge boundary 308. For example, the width dimension 316A is narrower than the width dimension 316B, as shown in FIG. 3. Alternatively, the locator keyway 300 can have another shape. For example, the shape and relative dimensions of locator keyway 300 shown in FIG. 3 are provided as one example. The shape and/or relative dimensions of the locator keyway 300 can change in other embodiments of the inventive subject matter described herein.

In one embodiment, the boundaries 302, 304 on opposite sides of the keyway 300 are identical. Alternatively, one of the boundaries 302, 304 may differ from the other. For example, the superior or lower boundary 302 may have a chamfered or rounded edge that is not in the corresponding part of the inferior or upper boundary 304. This chamfered or rounded edge may make it easier to place the keyway 300 onto a flared end 604 of a locator key 602 (described below).

Figure 4:
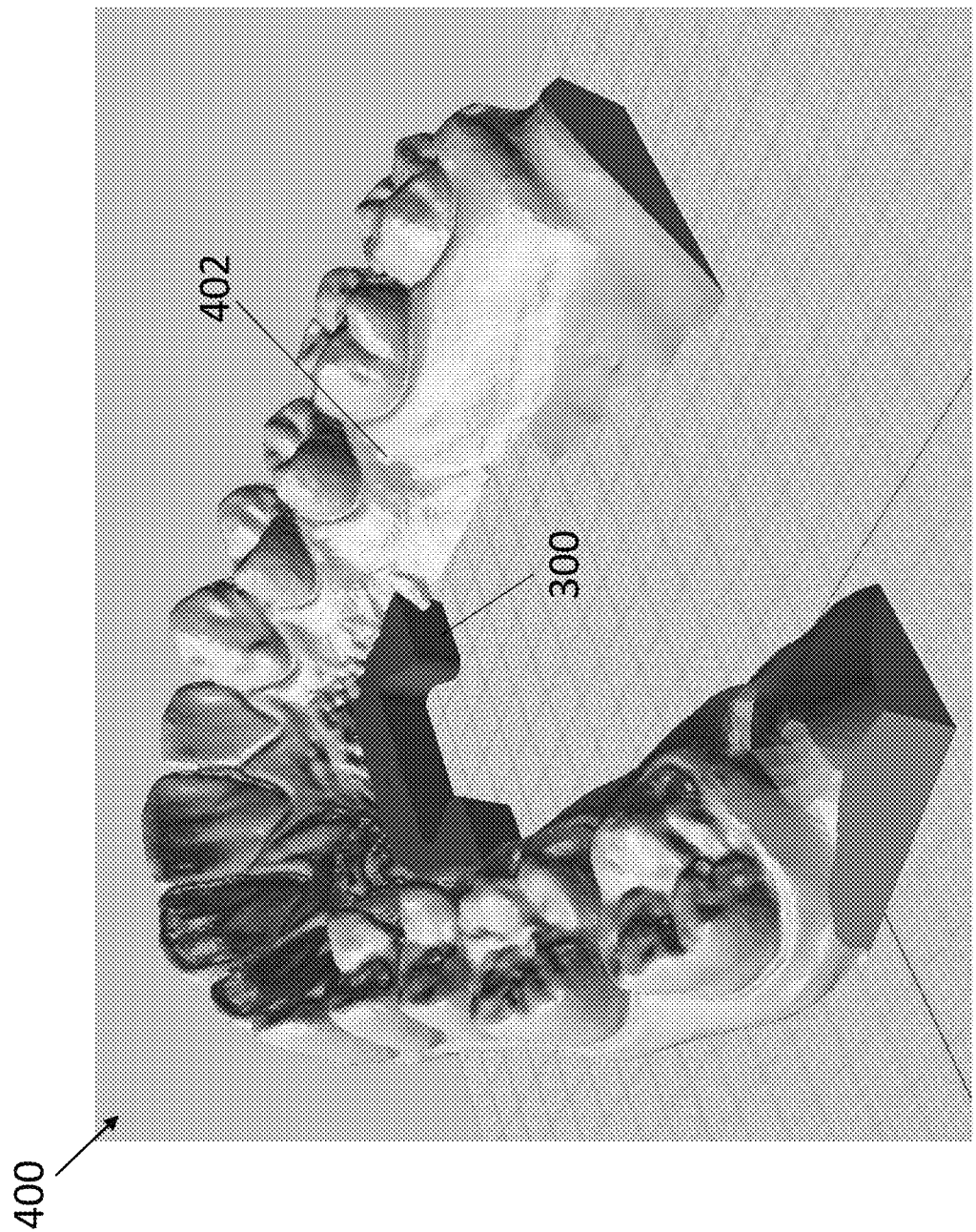
FIG. 4 illustrates one example of a rendered image of a modified 3D digital model of the set of teeth shown in FIG. 2 with a locator keyway.

FIG. 4 illustrates one example of a rendered image 400 of a modified 3D digital model 402 of the set of teeth shown in FIG. 2. This image 400 provides a perspective view of the digital model 202 shown in FIG. 2 that is modified to include the locator keyway 300 shown in FIG. 3. As shown, the locator keyway 300 is a hybrid locator keyway that includes an added portion 404 that is added to the digital model 202 to form the digital model 402 and that includes a replacement portion (not visible) that replaces part of the digital model 202 to form the digital model 402. The replacement portion is not visible because this portion extends into segments of the digital model 202 that represent the roof of a person's mouth (in the illustrated embodiment). The data representing the modified digital model 402 can be stored in the memory 106 (shown in FIG. 1).

The CAD system 108 adds the locator keyway 300 to the digital model 202 to create a locator feature in the digital model 402. As described above, the locator keyway 300 can increase the volume encompassed by the model 402 (relative to the model 202 by adding the positive locator keyway or a hybrid locator keyway) or can decrease the volume encompassed by the model 402 (relative to the model 202 by removing a negative locator keyway). This locator feature is used to correctly position a physical model of the teeth during subsequent fabrication steps of the dental aligner device.

Returning to the description of the manufacturing system 100 shown in FIG. 1, the CAD system 108 receives the modified digital model 402. The CAD system 108 examines the modified digital model 402 and creates a set of additional modified digital models 402 for the same set of teeth for a person or patient. The different modified digital models 402 in the set represent different positions of one or more of the person's teeth. For example, the CAD system 108 can be provided with a single modified digital model 402 of the teeth that is based on images, impressions, or the like, and the CAD system 108 can create additional modified digital models 402 based on the original modified digital model 402. Each additional modified model 402 can include one or more of the teeth in a different position than one or more (or all) other modified models 402 in the same set.

The modified models 402 in a set can represent different states of the same set of teeth in a progression from (or closer to) initial or current positions of the teeth to (or closer to) final or desired positions of the teeth. A different dental aligner device can be created for two or more (or each) of the different digital models 402 in the set to guide the actual changes in the positions of the teeth of the person wearing the dental aligner devices.

In one embodiment, the data representing the original digital model 202 is first modified to include the locator keyway 300 (to form the modified model 402) and the additional digital models 402 are created from the data representing the modified digital model 402 to also include the locator keyway 300. This ensures that the locator keyway 300 is in the same location in each of the modified digital models 402 in a set. Alternatively, the data representing the locator keyway 300 can be separately added to each of the digital models 202 in the set. For example, the several additional modified models 402 having the teeth in different positions can be created and then the locator keyway 300 can be added to these models 402. The modified models 402 having the locator keyway 300 and showing the different teeth positions can be referred to as the progression digital models and can be stored in the memory 106.

A printing system 110 obtains one or more (or all) of the progression digital models (from the memory 106 and/or the CAD system 108) and creates physical models of the teeth with the locator keyway 300. The printing system 110 can represent one or more 3D printers or printing devices. The printing system 110 can 3D print or otherwise form the physical models of the teeth and locator keyway 300. In one embodiment, the physical model includes bodies in the shape of the teeth and part of the inside of the mouth, as well as at least the portion of the locator keyway 300 that projects outside of the inside of the mouth (for positive locator keyways 300 and/or hybrid locator keyways). Optionally, the physical model includes bodies in the shape of the teeth and part of the inside of the mouth with one or more voids in the shape of the locator keyway 300 (for negative locator keyways).

Figure 5:
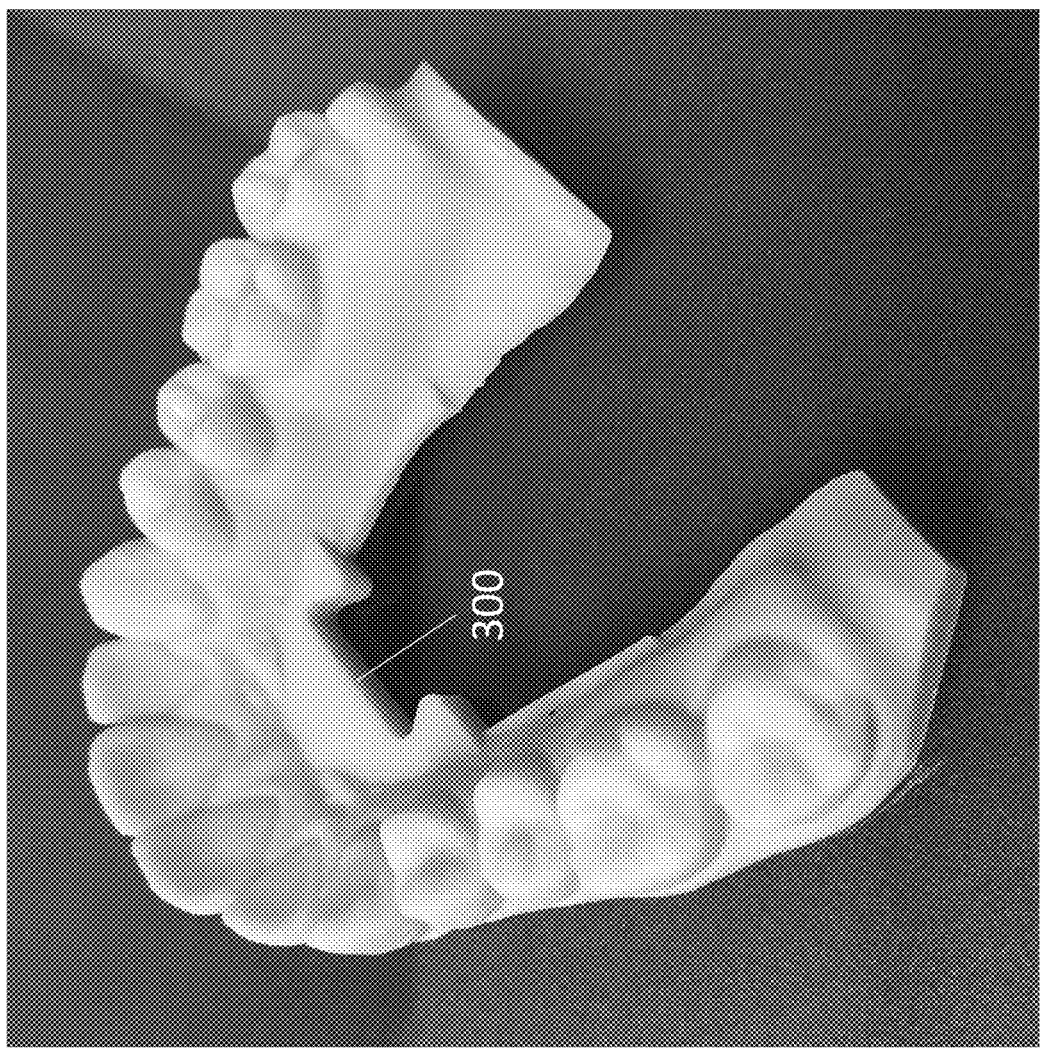
FIG. 5 is a perspective view of one example of a physical model of teeth.

FIG. 5 is a perspective view of one example of a physical model 500 of teeth. The physical model 500 is a tangible, non-transitory body that is printed by the printing system 110 based on at least one of the progression digital models of the teeth. As shown, the body of the physical model 500 includes a shape 502 corresponding to the locator keyway 300. Optionally, the body of the physical model 500 may include a void having a shape that corresponds to the locator keyway. As described above, several physical models 500 can be created for the same set of teeth of the same person, with each physical model 500 having the teeth in a different location or position than one or more (or all) other physical models 500 for the same set of teeth.

Returning to the description of the manufacturing system 100 shown in FIG. 1, a physical model 500 of the set of physical models 500 created by the printing system 110 is placed into a forming system 112. The forming system 112 creates dental aligner devices using the physical models 500. In one embodiment, the forming system 112 is a thermoforming system that creates each of the dental aligner devices for the same set of teeth of a person by thermoforming a polymer-based sheet of material over a different physical model 500 of the physical models 500 in the set. Alternatively, the forming system 112 can be the same printing system 110 or another printing system that 3D prints the dental aligner devices.

Figure 6:
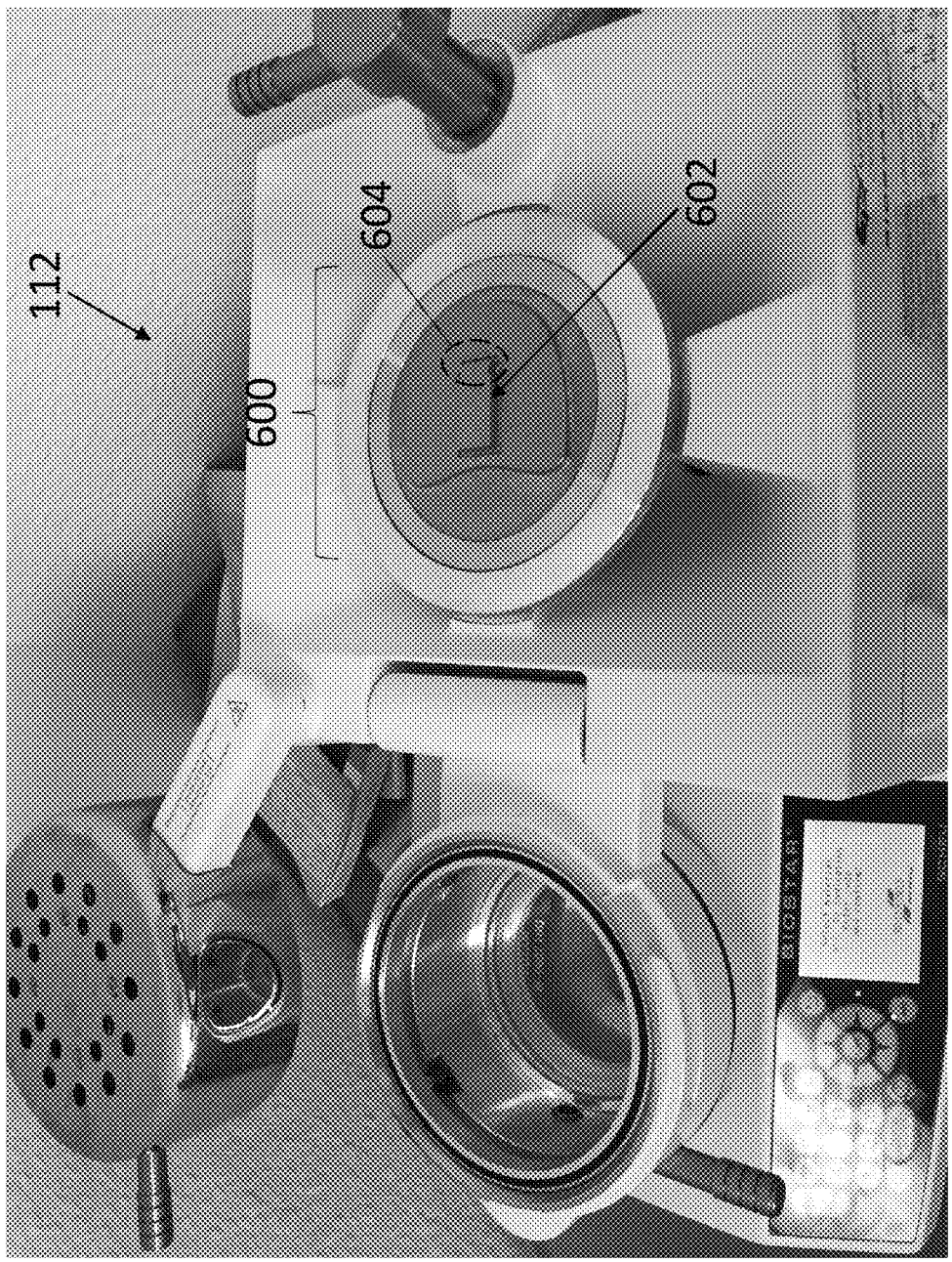
FIG. 6 illustrates one example of a forming system shown in FIG. 1.
Figure 7:
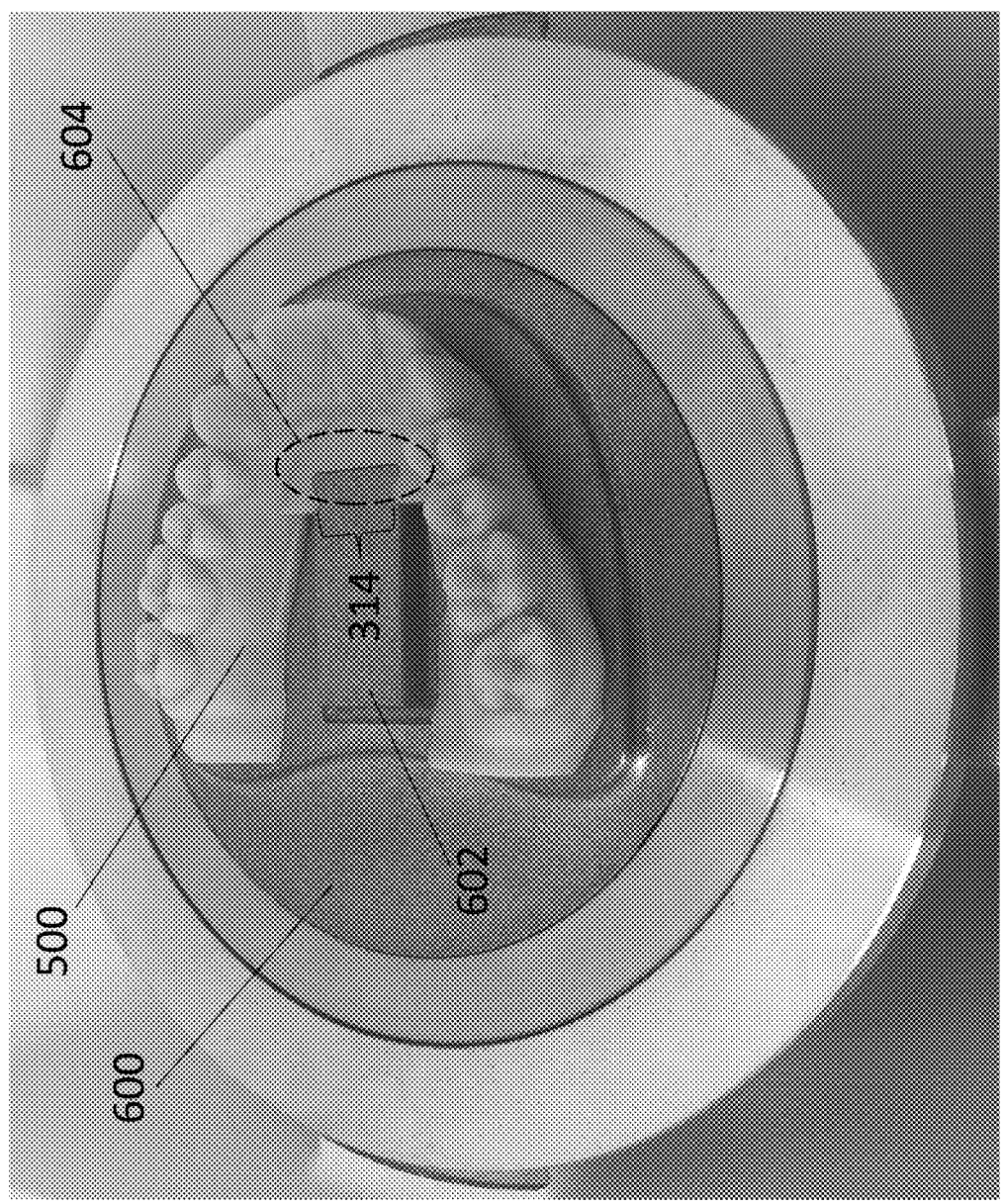
FIG. 7 illustrates a perspective view of a physical model shown in FIG. 5 on a platform of the forming system shown in FIG. 6.

FIG. 6 illustrates one example of the forming system 112 shown in FIG. 1. The forming system 112 is shown as a thermoforming system in FIG. 6. The forming system 112 includes a platform 600 on which a physical model 500 is placed. With continued reference to the forming system 112 shown in FIG. 6, FIG. 7 illustrates a perspective view of the physical model 500 shown in FIG. 5 on the platform 600 of the forming system 112 shown in FIG. 6. The platform 600 includes a locator key 602. The locator key 602 is a protrusion that outwardly extends from the platform 600. The locator key 602 has a shape that fits into the locator keyway 300 formed in the physical model 500. For example, the locator key 602 has an outwardly flared end 604 having a complimentary shape to the shape of the recess 314 formed in the keyway 300 of the physical model 500.

The physical model 500 is placed onto the platform 600 such that the locator key 602 of the platform 600 fits into and mates with the recess 314 formed in the keyway 300 of the physical model 500. Optionally, the locator key 602 is separate from the platform 600. This separate locator key 602 can be connected with the locator keyway 300 to mate the locator key 602 with the physical model 500, and the combination of the physical model 500 and the locator key 602 can be placed onto a flat platform that does not include the locator key 602 as part of the platform 600.

This mating secures the physical model 500 onto the platform 600. A planar sheet of a polymer-based material is placed over the physical model 500 and is thermoformed onto the physical model 500 by the forming system 112. This changes the shape of the planar sheet of the polymer-based material to a 3D shape that is the same as or follows the 3D shape of the physical model 500 and the locator key 602. This 3D shape of the polymer-based material forms a dental aligner device. The dental aligner device and the physical model 500 can be removed from the platform 600.

Figure 8:
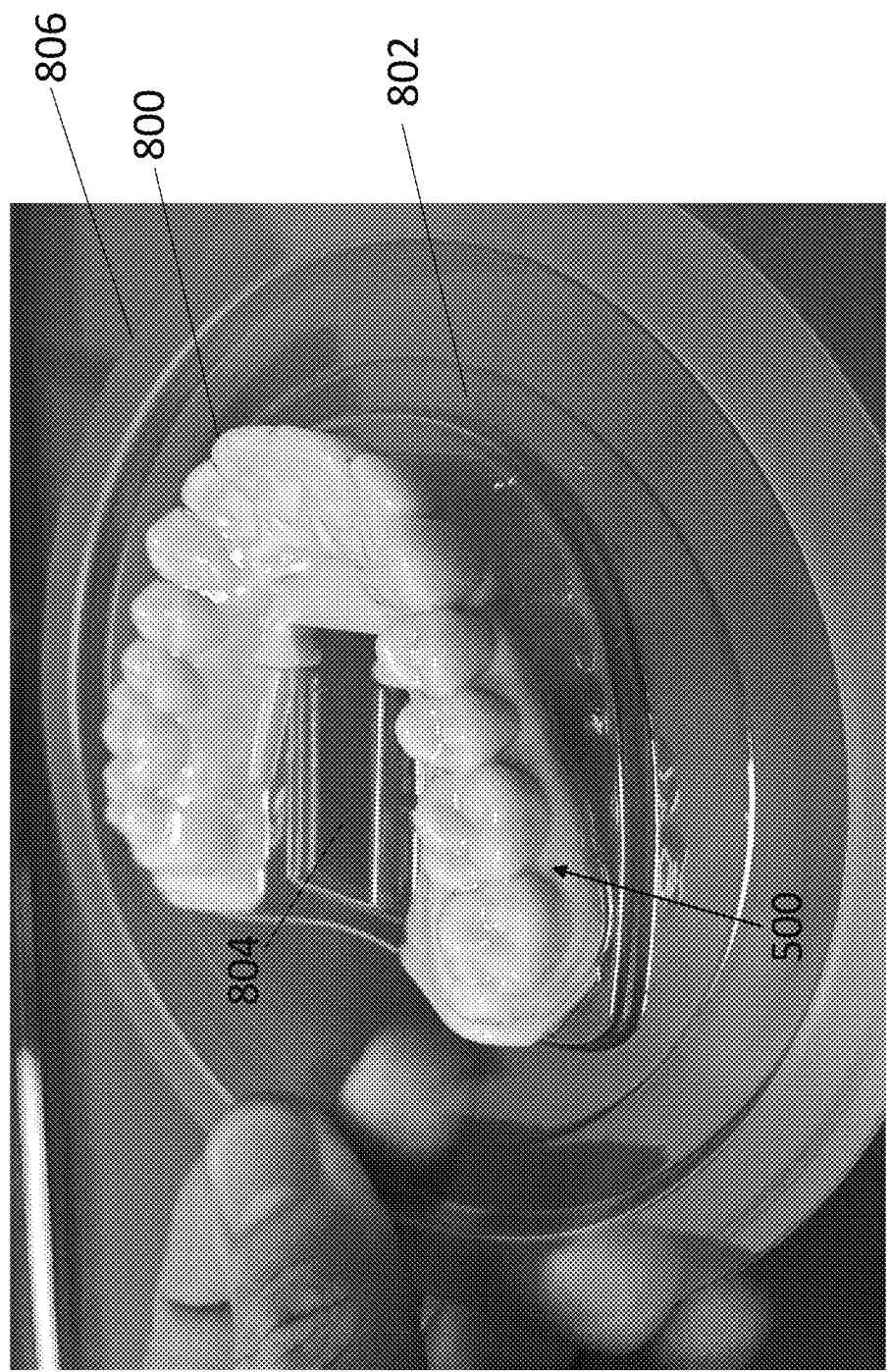
FIG. 8 is a perspective view of a dental aligner device having extraneous material with the physical model shown in FIG. 5 held in the contours of a dental aligner device.

FIG. 8 is a perspective view of a dental aligner device 800 having extraneous material 802 with the physical model 500 held in the contours of the dental aligner device 800. The dental aligner device 800 is formed by a portion of a thermoformed sheet 806 of polymer-based material that is in the shape of the physical model 500. The extraneous material 802 includes portions of the thermoformed sheet 806 that would not fit within the mouth of a person wearing the dental aligner device 800.

The thermoforming of the dental aligner device 800 can involve applying a vacuum or pressure to hold the polymer-based material sheet onto the physical model 500 and locator key 602 while the polymer-based material sheet is heated and compressed onto the physical model 500 and the locator key 602. In one embodiment, the locator key 602 is formed from a porous material that aids in allowing air to be removed from the space between the polymer-based material sheet and the locator key 602. For example, the locator key 602 and/or remainder of the platform 600 can be formed from porous aluminum or another porous material. The air can be removed through the pores in the locator key 602. This can aid in applying a suction or vacuum force pulling the sheet onto the physical model 500.

Thermoforming the polymer-based sheet onto the physical model 500 and the locator key 602 also forms a void 804 in the extraneous material 802 of the dental aligner device 800. This void 804 is formed as a pocket in the extraneous material 802 located within the arch formed by the physical model 500 (e.g., between parts of the physical model 500 representing opposing teeth), as shown in FIG. 8.

Returning to the description of the manufacturing system 100 shown in FIG. 1, the dental aligner device 800 with the extraneous material 802 is placed into a milling system 114. The milling system 114 can be an automated milling machine having hardware circuitry that includes and/or is connected with one or more processors that control the functions associated with the milling system 114. The milling system 114 can automatically mill, or cut, separating the extraneous material 802 from the dental aligner device 800. The extraneous material can then be removed so that the dental aligner device 800 without the extraneous material 802 can fit into the mouth of the person (on whom the models 202, 402, 500 are based).

Figure 9:
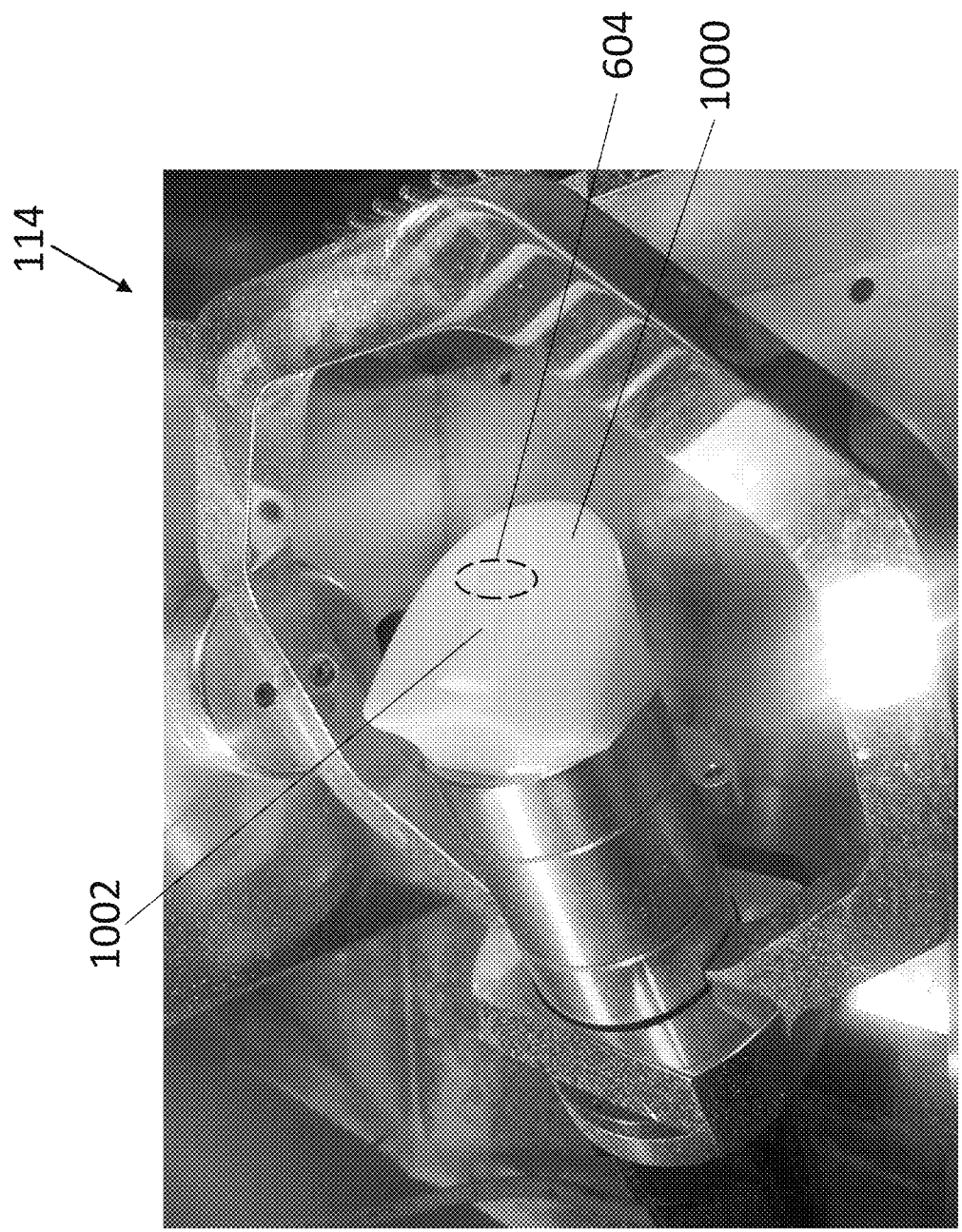
FIG. 9 illustrates a perspective view of a milling system shown in FIG. 1.
Figure 10:
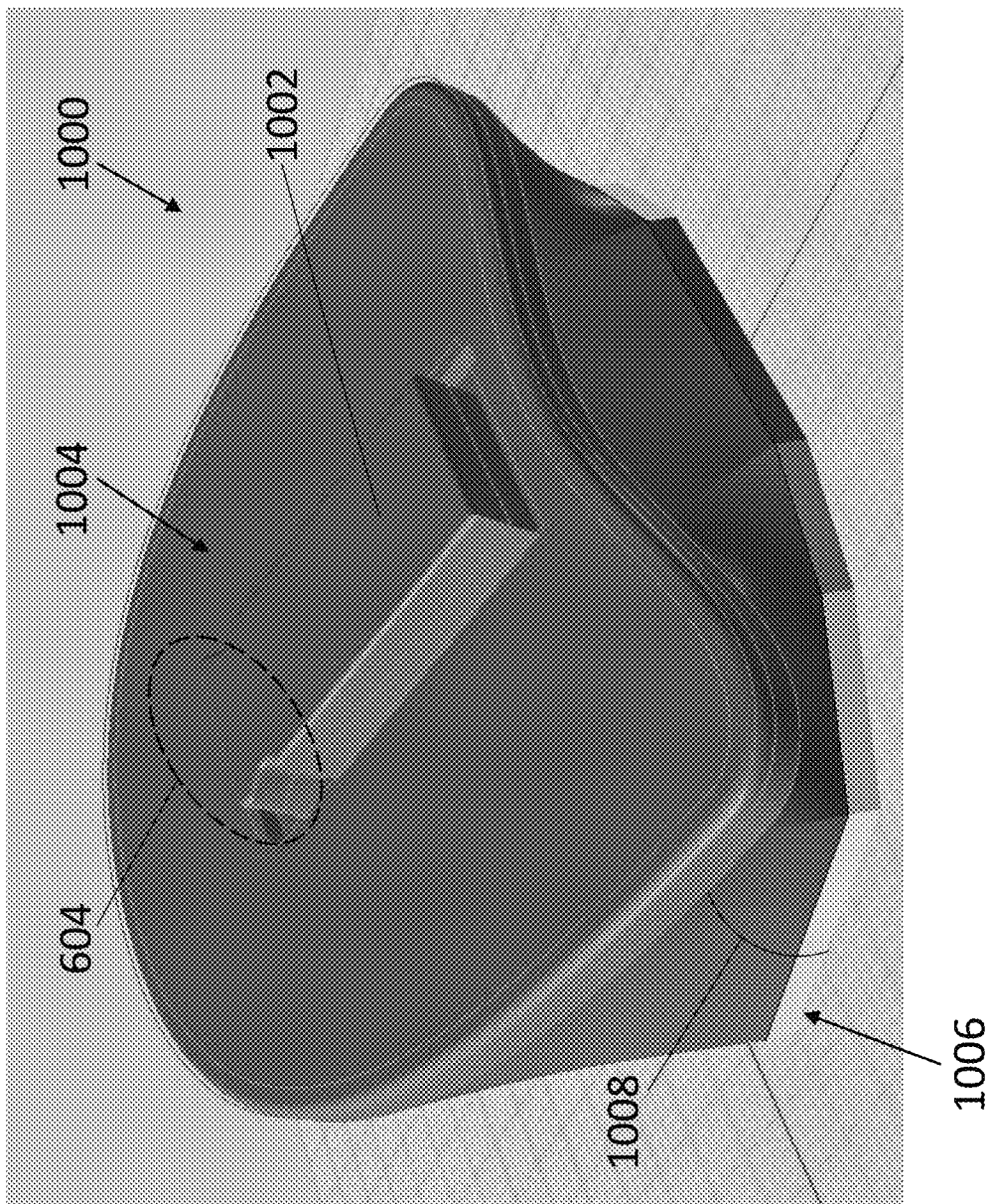
FIG. 10 illustrates a perspective view of a platform of the milling system shown in FIG. 9.
Figure 11:
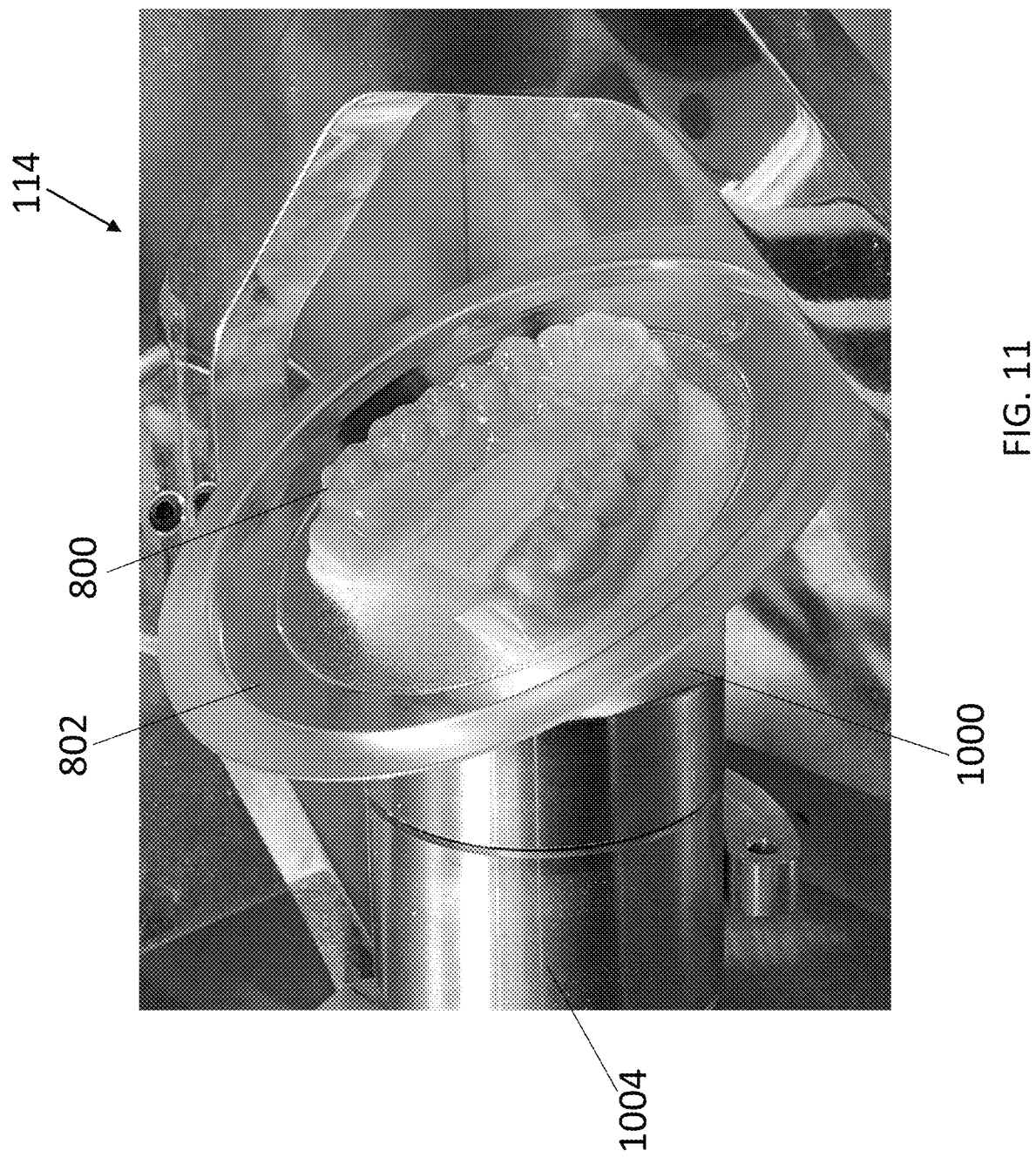
FIG. 11 illustrates a perspective view of the dental aligner device shown in FIG. 8 with extraneous material placed on the platform of the milling system shown in FIG. 10.

FIG. 9 illustrates a perspective view of the milling system 114 shown in FIG. 1. FIG. 10 illustrates a perspective view of a platform 1000 of the milling system 114 shown in FIG. 9. FIG. 11 illustrates a perspective view of the dental aligner device 800 with the extraneous material 802 placed on the platform 1000 of the milling system 114.

Similar to the platform 600 of the forming system 112, the platform 1000 of the milling system 114 includes a locator key 1002 having the outwardly flared end 604. The locator key 1002 into and mates with the void 804 in the extraneous material 802 of the dental aligner device 800. The flared end 604 of the locator key 1002 fits into and mates with the recess 314 formed in the physical model 500. This mating secures the dental aligner device 800, extraneous material 802, and the physical model 500 to the platform 1000 of the milling system 114 ensuring the correct alignment to the fixture 1000. Optionally, vacuum pressure can be used to secure the aligner device 800, extraneous material 802, and the physical model 500 to the platform 1000. For example, the upper surface 1004 of the platform 1000 can include one or more openings that are fluidly coupled with a pump that generates suction (e.g., a vacuum) to pull and hold the aligner device 800, extraneous material 802, and/or physical model 500 to the upper surface 1004 of the platform 1000. The dental aligner device 800, extraneous material 802, and the physical model 500 can be held in place by a vacuum applied through one or more openings or ports in the fixture 1000. Optionally, the aligner device, extraneous material, and/or physical model can be held in place by another source of a holding force (e.g., one or more magnets, one or more clamps, etc.).

One difference between the platforms 600, 1000 is that while the platform 600 may lie flat, the platform 1000 has the shape of a wedge. For example, the upper surface of the platform 600 may be parallel to the ground and/or the opposite, bottom surface of the platform 600. In contrast, an upper surface 1004 of the platform 1000 is oriented at an acute angle 1008 to the ground and/or an opposite, bottom surface 1006 of the platform 1000. As shown, the upper surfaces of the platforms 600, 1000 may be the surfaces from which the locator keys project from the platforms 600, 1000. The wedge-shaped platform 1000 allows for the milling system 114 to have a continuously varying angle of a cutting or milling tool (described below) relative to the aligner device 800 that is being cut, while using only a single rotary axis. The angle 1008 between the upper and bottom surfaces 1004, 1006 may be different in different systems 100. For example, one system 100 may have the wedge platform 1000 with a ten degree angle 1008 between the surfaces 1004, 1006, another system 100 may have the wedge platform 1000 with a twenty degree angle 1008 between the surfaces 1004, 1006, another system 100 may have the wedge platform 1000 with a thirty degree angle 1008 between the surfaces 1004, 1006, or the like.

A user of the manufacturing system 100 can manually define a cutting path along which the milling system 114 is to cut the extraneous material 802 from the dental aligner device 800. In one embodiment, a computer-aided manufacturing (CAM) system 102 displays the rendered image 400 of the modified model 402 of the teeth on an output device 116, such as an electronic display, a touchscreen, or the like. This CAM system 102 can be used to manually define the cutting path. Alternatively, the CAD system 108 can be used to automatically define the cutting path. For example, the CAD system 108 can automatically select the cutting path by identifying locations that are a designated distance away from the teeth in the modified model 402, that define a designated shape of the aligner device 800 that is to be cut, or the like. The CAM system 102 can represent hardware circuitry that includes and/or is connected with one or more processors that control or perform the functions described in connection with the CAM system 102. The CAM system 102 may be separate from the CAD system 108 in that the CAD system 108 and the CAM system 102 may operate using separate hardware and processor(s). Alternatively, the CAD system 108 and the CAM system 102 share one or more portions of hardware circuitry and/or processor(s). In one embodiment, the systems 102, 108 are the same system which can be referred to as a CAD/CAM system.

Alternatively, the cutting path may be generated by the treatment planning software during the treatment planning process. In this case the treatment planning software is represented in FIG. 1 by the CAD system 108. The automatically generated cutting path may subsequently be manually edited if desired. Once the cutting path for the initial treatment stage is set, the cutting path can be automatically modified for each stage of the treatment process, with the position of the cutting line changing in step with the moving positions of the teeth at each treatment stage. The output trim lines will be processed by the CAM system 102 and the resulting programs stored in memory 106 before being sent to the milling system 114.

The user can use the CAM system 102 to define a cutting line or path along the rendered image 400 where the milling system 114 is to cut the extraneous material 802 from the dental aligner device 800. For example, the user can manually draw the cutting line or path on the rendered image 400 that is displayed using the input device 104. This cutting line or path can then be stored in the memory 106 and/or communicated to the milling system 114.

Figure 12:
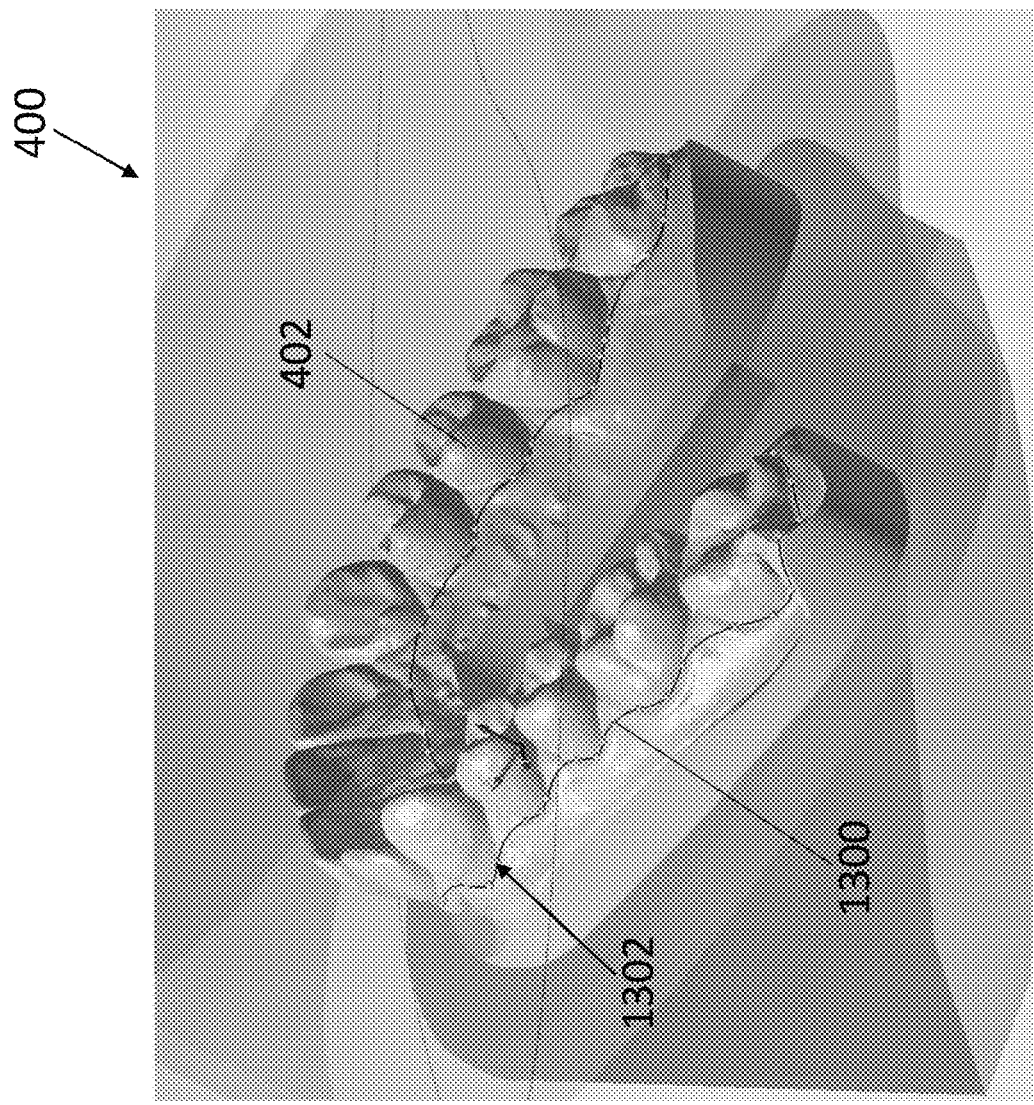
FIG. 12 illustrates one example of the rendered image of the modified model of the teeth with a cutting path.
Figure 13:
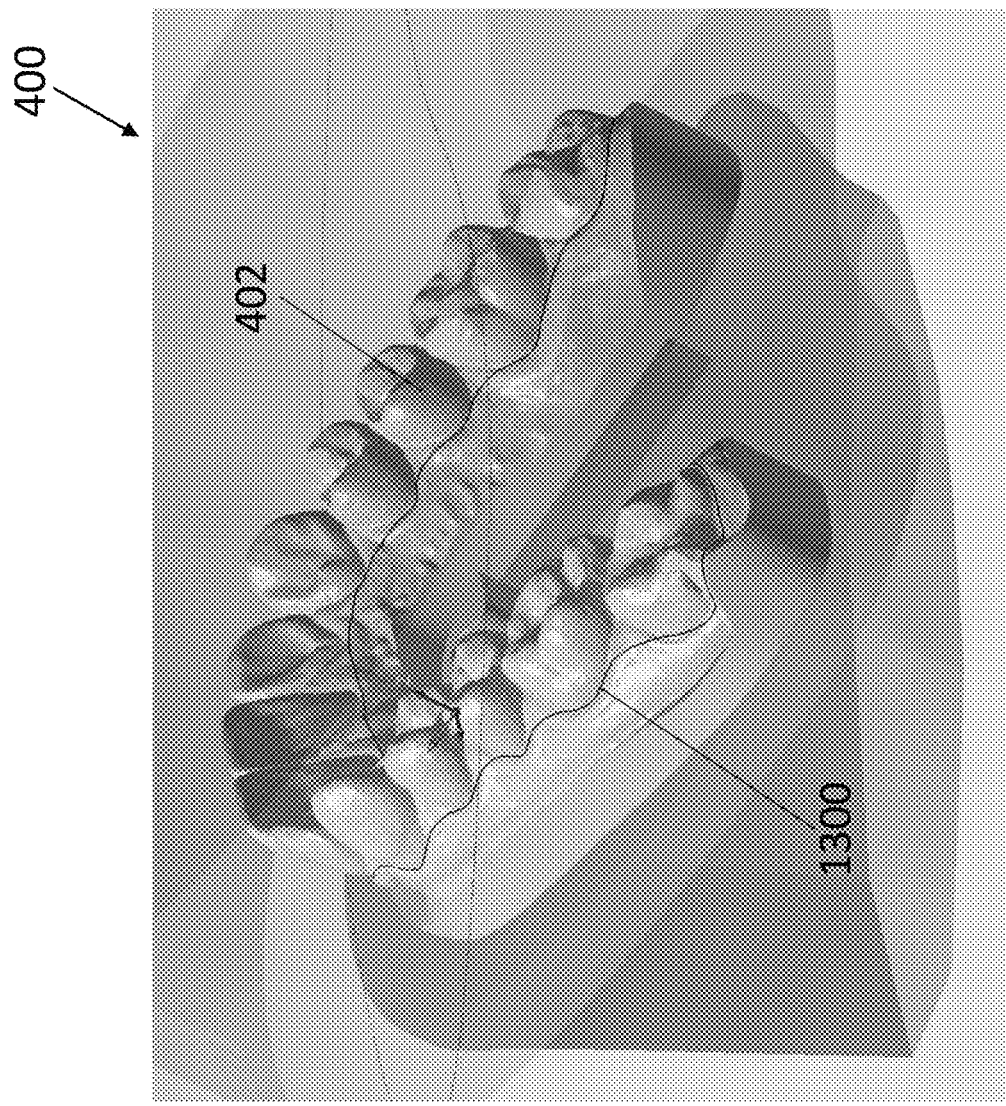
FIG. 13 illustrates another example of the rendered image of the modified model of the teeth with the cutting path shown and defined locations shown in FIG. 12 removed.

FIG. 12 illustrates one example of the rendered image 400 of the modified model 402 of the teeth with a cutting path 1300. The cutting path 1300 may be manually defined or automatically generated. The image 400 can be presented on the output device 116 by the CAM system 102. The user can manually define the path 1300 by using the input device 104 to select points or locations 1302 on the rendered image 400 of the modified model 402. Alternatively, the path 1300 and/or the locations 1302 can be automatically defined. The CAM system 102 can connect the locations 1302 with smoothed lines 1304 to form the path 1300. In one embodiment, no part of the path 1300 is generated by the CAM system 102. For example, the path 1300 may only be created by the CAM system 102 connecting the locations 1302 selected by the user, thereby limiting the path 1300 to the user-defined locations 1302. The CAM system 102 can round off or smooth the lines 1304 that meet at a user-defined location 1302 to prevent sharp peaks or valleys from being created. But, no part of the path 1300 is selected or defined by the CAM system 102. FIG. 13 illustrates another example of the rendered image 400 of the modified model 402 of the teeth with the cutting path 1300 shown and the locations 1302 shown in FIG. 12 removed. Alternatively, the user can use the input device 104 to draw the cutting path 1300. For example, instead of defining locations 1302 through which the cutting path 1300 extends, the user may free-hand draw the path 1300 using the input device 104.

Figure 14:
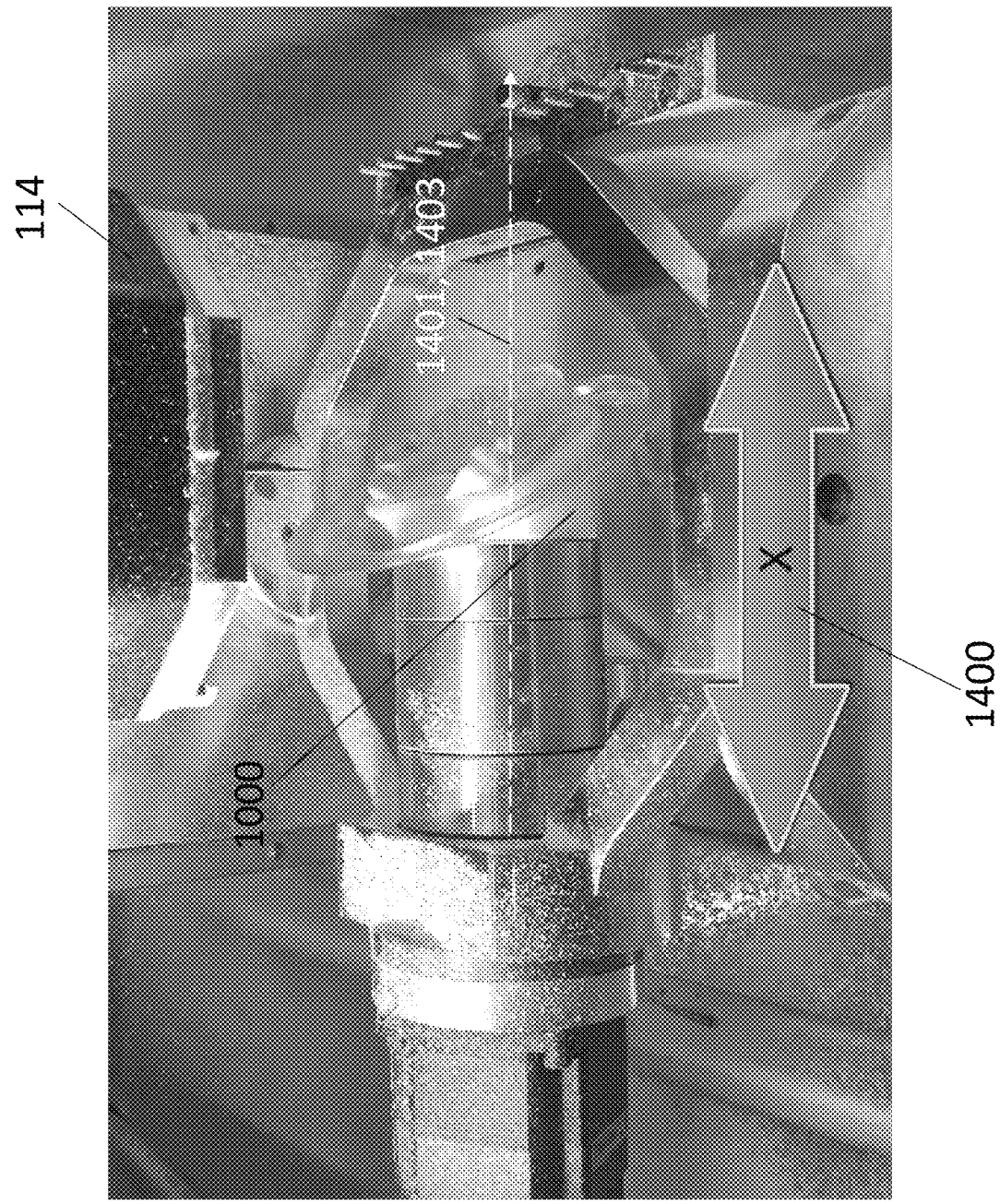
FIG. 14 illustrates movement of the platform relative to the milling system in one direction parallel to or along an x-axis of the milling system.
Figure 15:
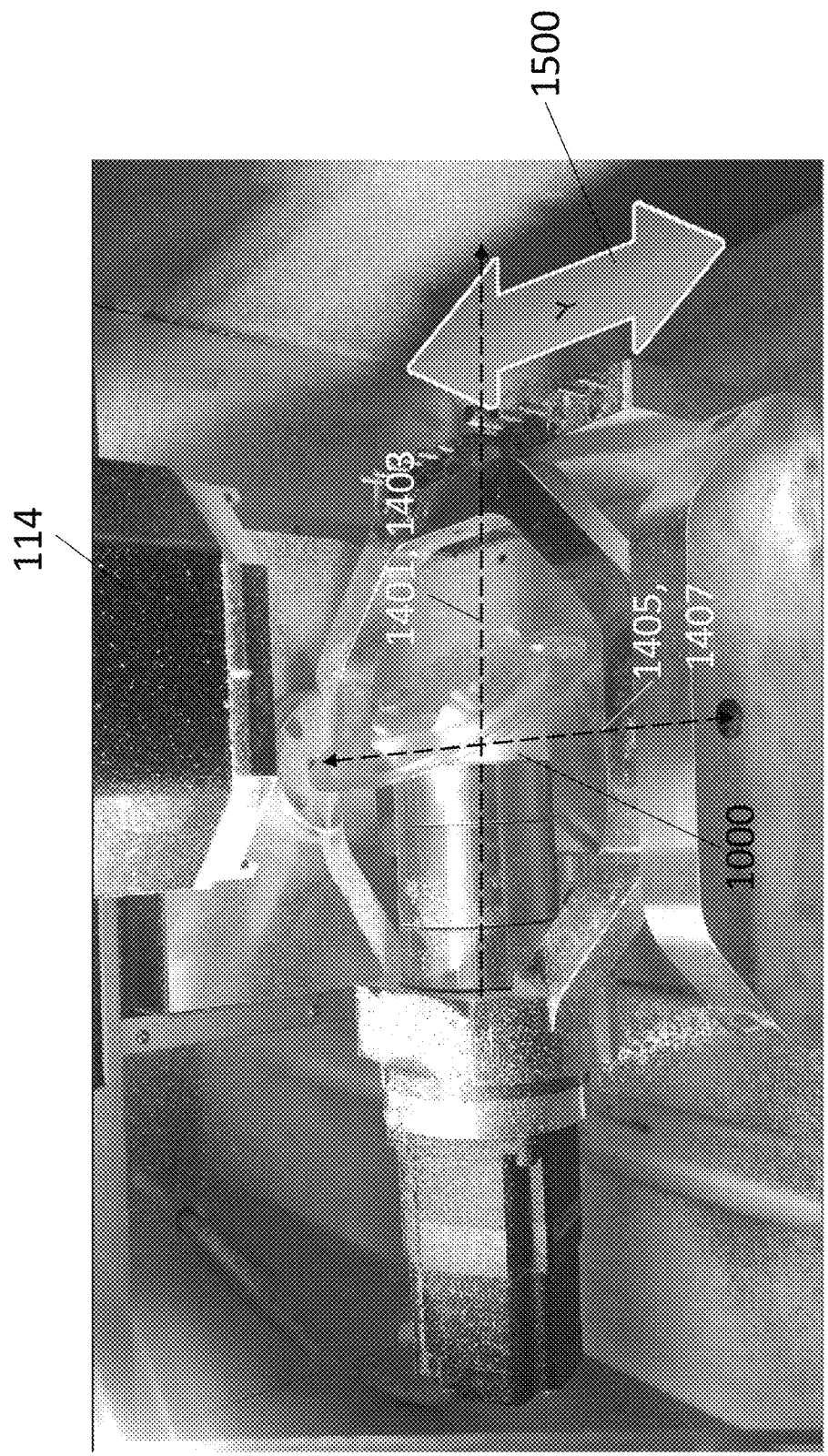
FIG. 15 illustrates movement of the platform relative to the milling system in one direction parallel to or along a y-axis and a B-axis of the milling system.
Figure 16:
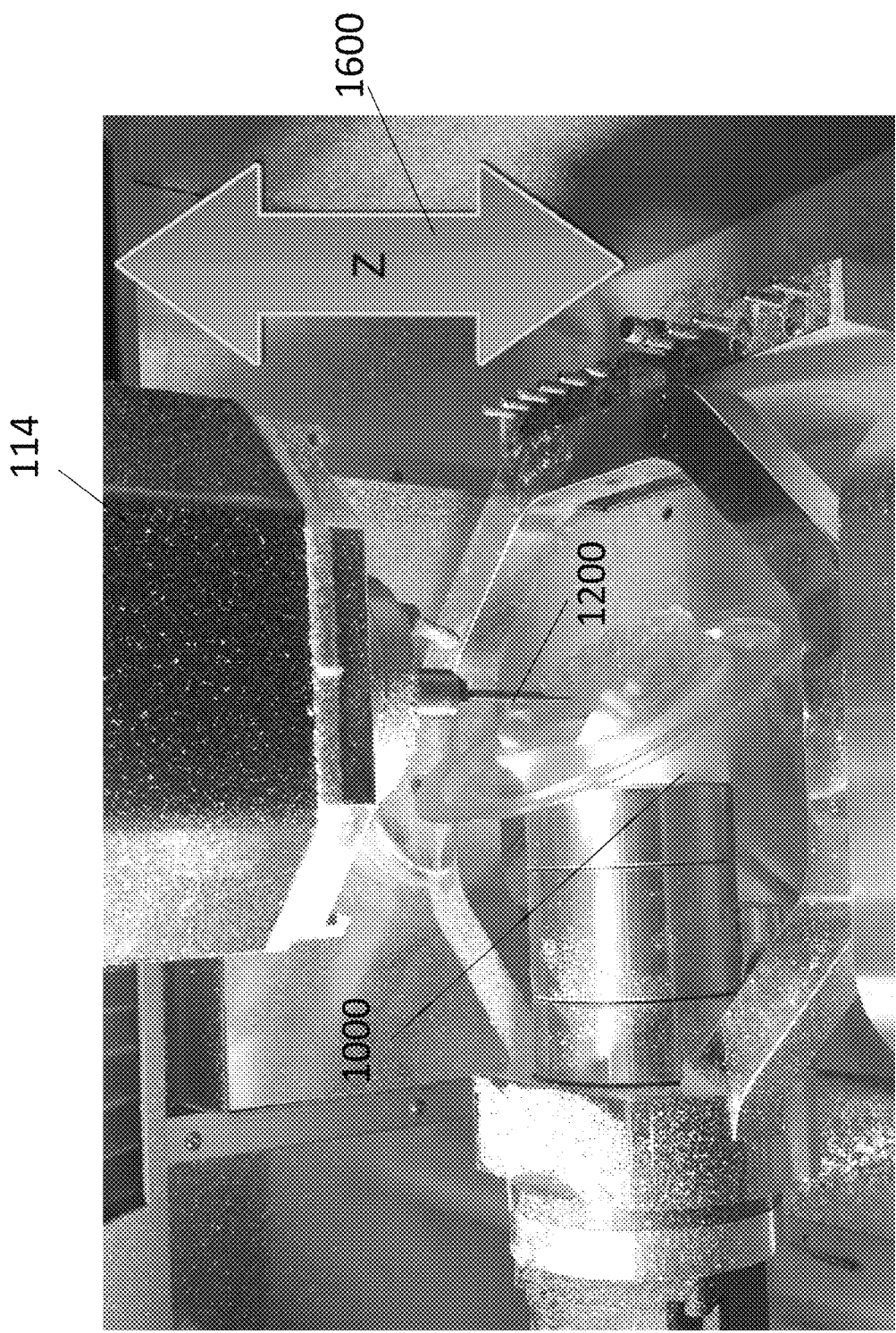
FIG. 16 illustrates movement of the milling tool of the milling system toward the platform along a z-axis of the milling system.

FIG. 14 illustrates movement of the platform 1000 relative to the milling system 114 in a first direction 1400 of the milling system 114. This direction 1400 is parallel to an x-axis 1401 of the milling system 114. An A-axis 1403 is shown and is parallel to the x-axis 1401 in FIG. 14. FIG. 15 illustrates movement of the platform 1000 in a second direction 1500 along a y-axis 1405 and a B-axis 1407 of the milling system 114. FIG. 16 illustrates movement of a cutting or milling tool 1200 of the milling system 114 toward the platform 1000 along or parallel to a z-axis 1600 of the milling system 114.

Figure 17:
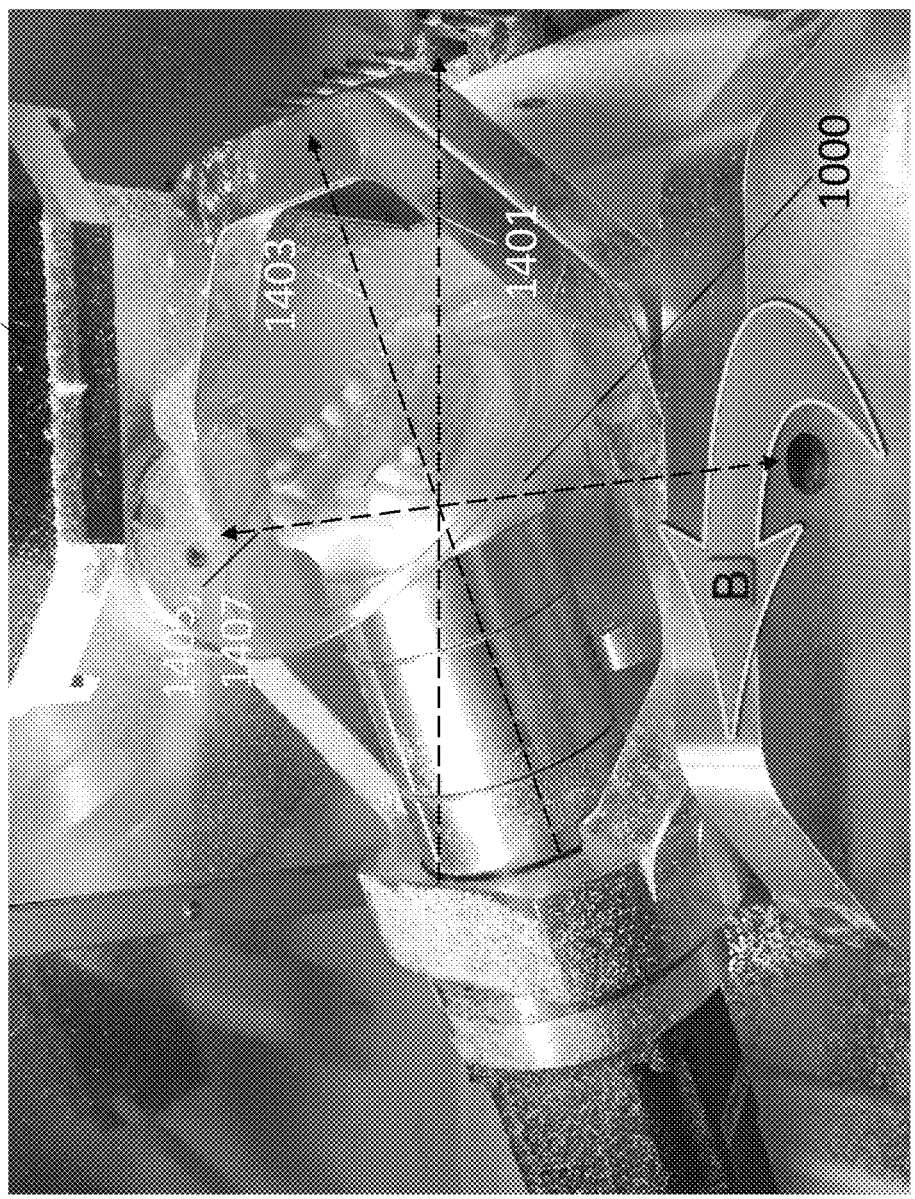
FIG. 17 illustrates rotation of the platform relative to the milling system around the B-axis shown in FIG. 15.

In the position shown in FIGS. 14 through 16, the x-axis 1401 and the A-axis 1403 are parallel to each other and the y-axis 1405 and the B-axis 1407 are parallel to each other. The platform 1000 can rotate around or about the A-axis 1403 and/or the B-axis 1407. Rotation about the B-axis 1407 tilts the platform 1000 upward relative to the position shown in FIGS. 14 through 16. This rotation causes the A-axis 1403 to no longer be parallel to the x-axis 1401. Instead, the A-axis 1403 is transversely angled with respect to the x-axis 1401. FIG. 17 illustrates this type of rotation of the platform 1000 relative to the milling system 114 around the B-axis 1407. As shown, the A-axis 1403 is no longer parallel to the x-axis 1401 due to the rotation around the B-axis 1407.

Figure 18:
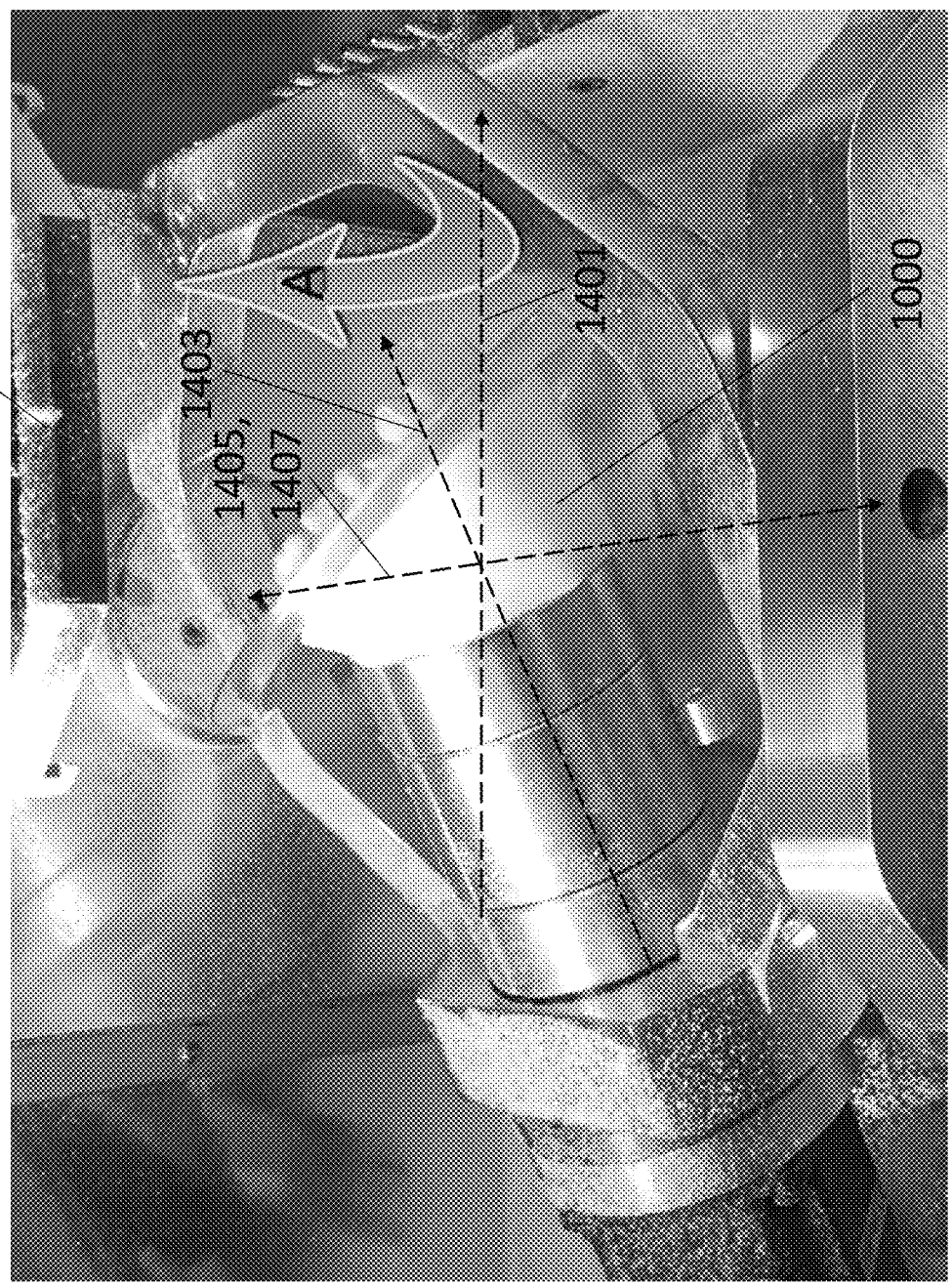
FIG. 18 illustrates rotation of the platform relative to the milling system around the A-axis shown in FIG. 14.

FIG. 18 illustrates rotation of the platform 1000 relative to the milling system 114 around the A-axis 1403 of the milling system 114. Prior to cutting any extraneous material 802, the milling system 114 rotates the platform 1000 to a designated angle around the B-axis 1407. The platform 1000 is maintained at this angle during the entire process of cutting the extraneous material 802 from the aligner device 800. This size of this angle can be fixed to be large enough to prevent contact between the cutting or milling tool 1200 and the physical model 500 while cutting the extraneous material 802 from the aligner device 800.

Figure 19:
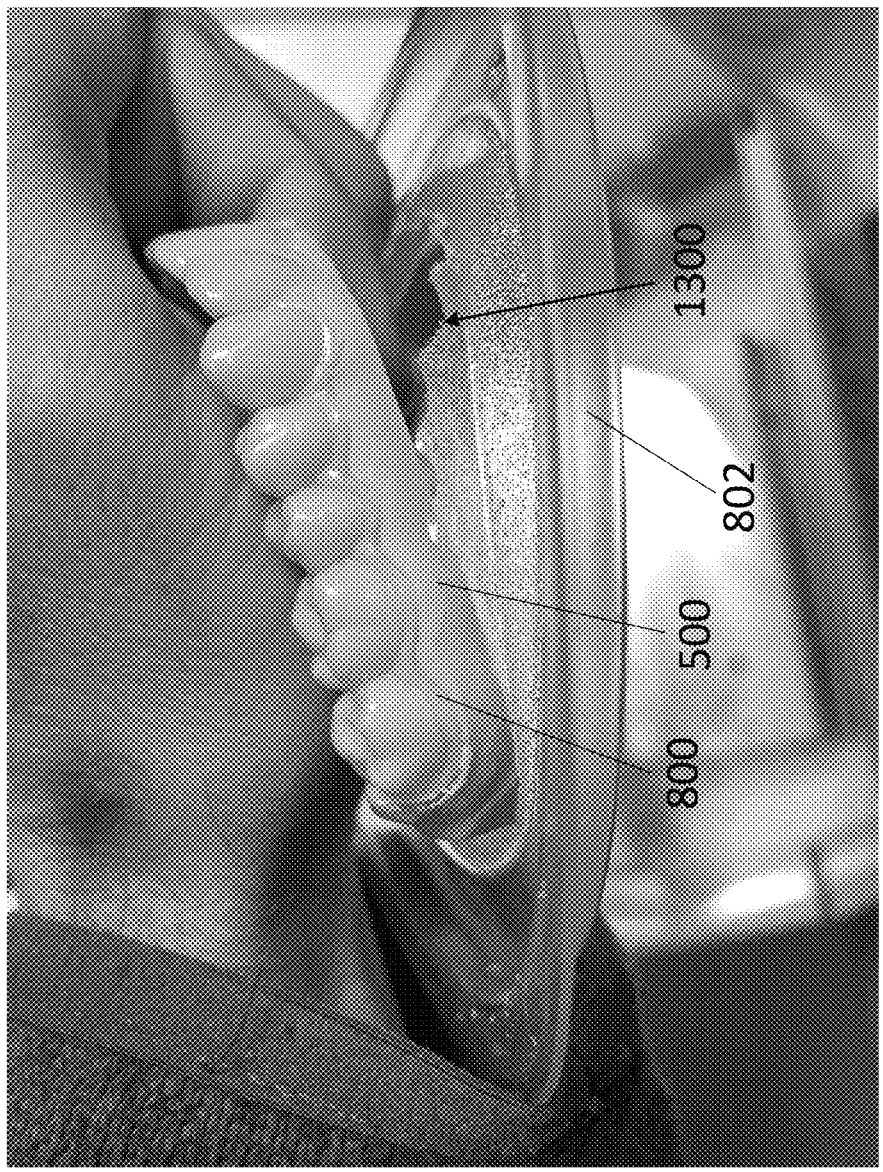
FIG. 19 illustrates one view of the dental aligner device being separated from the extraneous material.

Upon completion of cutting along the user-defined path, the dental aligner device 800 can be separated from the extraneous material 802. FIG. 19 illustrates one view of the dental aligner device 800 being separated from the extraneous material 802. As shown, the dental aligner device 800 separates from the extraneous material 802 along a user-defined path 1300 that the cutting or milling tool 1200 cut the extraneous material 802.

The locator key 602 allows for different physical models 500 to be accurately aligned during mating of the physical models 500 onto the platforms 600, 1000. The locator key 602 provides a fixed or constant frame of reference for locating the models 500 at every step of the process (e.g., during forming the aligner device 800, cutting the extraneous material, etc.). For example, different systems 100 may be located in various different geographic locations with the digital models 202 and/or cutting paths 1300 downloaded from one or more servers or other computers via one or more computer networks (e.g., via a cloud-based network). The downloaded digital models 202 are created to include the recess 314 and/or the downloaded cutting paths 1300 are created based on the location of the recess 314 in the digital models 202 so that the physical models 500 created from the digital models 202 are accurately and precisely located on the various platforms 600, 1000. This can prevent misalignments or changes in alignments of other components of the systems 100 from incorrectly locating the cutting paths 1300 along the various physical models 500.

The physical models 500 can be provided with unique or semi-unique identifiers. For example, each physical model 500 can have a different identifier printed on the model 500 or all physical models 500 associated with the same patient may have the same identifier printed on the models 500 (but that is different from identifiers associated with the physical models 500 of other patients). Optionally, the aligner device can be provided with the identifier. The identifiers can be bar codes, quick response (QR) codes, or the like. The identifiers can be printed on labels that are adhered to the model 500 and/or aligner device, can be printed directly onto the model 500 and/or aligner device, and/or can be laser marked directly onto the model 500 and/or aligner device. An operator of the milling system 114 can scan the identifier (e.g., using a bar code reader or another optical reader) and the processor(s) of the milling system 114 can use the identifier that is determined from the scan to select the digital model or models associated with the identifier. For example, the cutting paths for a set of dental aligner devices 800 for a patient can be remotely created (e.g., created in a location that is not co-located with the milling system 114). The processor(s) of the milling system 114 can download the cutting path for cutting the extraneous material from a formed dental aligner device 800 using the identifier that is scanned. This cutting path can then be used by the milling system 114 to cut the extraneous material away, as described herein.

In embodiments where the wedge-shaped platform 1000 is used to cut the extraneous material 802 along the cutting path 1300, the angle 1008 of the platform 1000 (shown in FIG. 10) can be selected and/or the B-axis fixed angle of the cutting or milling tool 1200 can be selected to allow for cutting the extraneous material from different geometries and/or shapes of the aligner devices 800 and/or thicknesses of the material used to form the aligner devices 800. For example, the B-axis angle of the cutting or milling tool 1200 can be customized for individual customer needs while still having automatic processing of the digital models, cutting lines or paths, etc. The configuration also allows for modifications to the cutting process that are required for different materials, thicknesses (number of passes of the cutting or milling tool 1200), and cutting methods (e.g., different tools 1200, feeds, cutting speeds, etc.).

Figure 22:
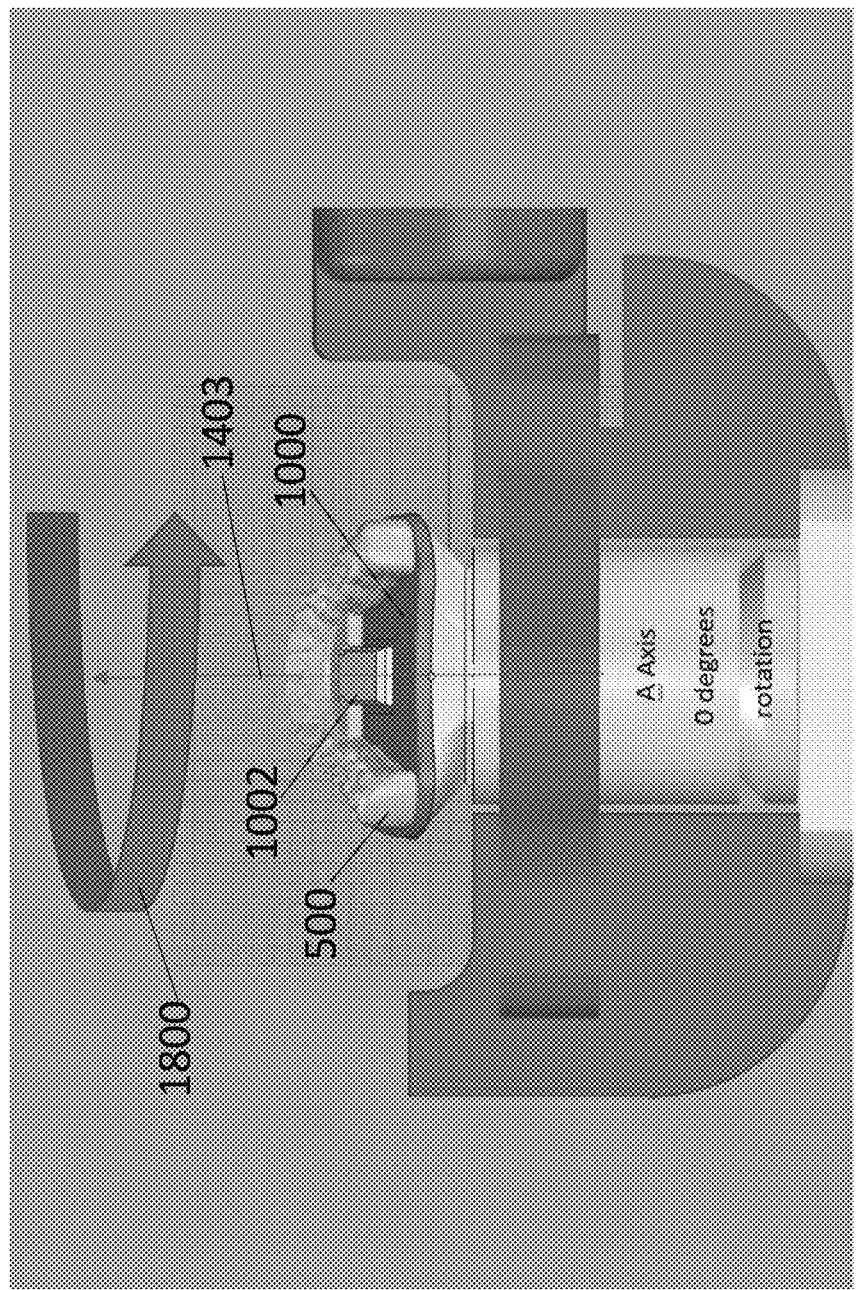
FIG. 22 illustrates the physical model shown in FIG. 5 on the wedge-shaped platform shown in FIG. 10.

FIGS. 22 through 26 illustrate additional examples of movement of the cutting tool 1200 along a cutting path during removal of extraneous material from an aligner device. FIG. 22 illustrates a plan view of the physical model 500 on the wedge-shaped platform 1000. In this view, the platform 1000 is at a zero degree position around or about the x-axis 1401. For example, the angle of rotation of the platform 1000 around the x-axis 1401 in the A-direction 1800 is zero degrees in FIG. 22.

FIGS. 23 through 26 illustrate rotation 1800 of the platform 1000 around the A-axis 1403 while the cutting tool 1200 remains at a fixed angle 2300 along the B-axis 1407. The angles shown in these Figures are provided as one example. Other angles may be used. In these examples, the angle 2300 between a direction of elongation 2302 of the cutting tool 1200 and the bottom surface 1006 of the platform 1000 remains fixed while the platform 100 rotates around the A-axis 1403. The wedge-shaped platform 1000 allows the angle 2300 of the cutting tool 1200 to remain fixed or unchanging during cutting of the extraneous material from aligner devices while the platform 1000 rotates to orient the cutting tool 1200 at angles that allow cutting of the extraneous material. For example, the angle 2300 of the cutting tool 1200 allows the cutting tool 1200 to remain at nearly perpendicular angles (e.g., within one to three degrees of perpendicular) relative to the surface of the extraneous material being cut away along the cutting path 1300. The wedge-shaped platform 1000 allows a cutting angle 2304 between the direction of elongation 2302 of the cutting tool 1200 to change at different rotations of the physical model 500 around the A-axis 1403 while the angle 2300 of the cutting tool 1200 relative to the bottom surface 1006 of the platform 1000 remains constant.

Figure 23:
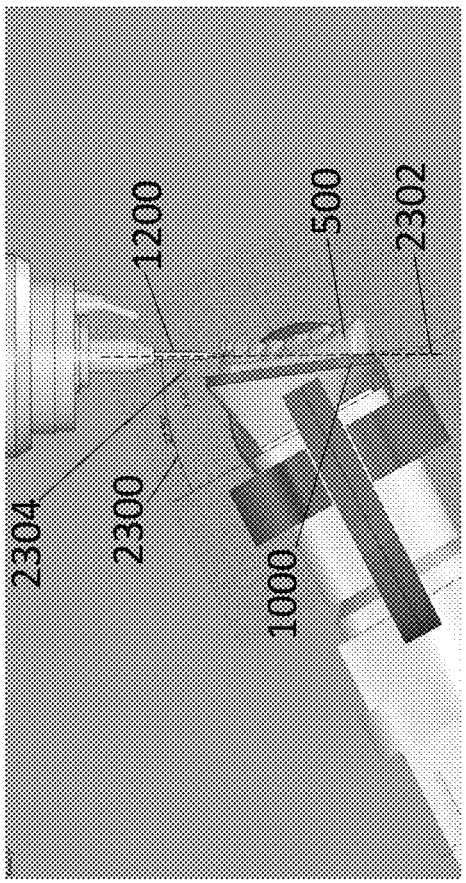
FIG. 23 illustrates rotation of the wedge-shaped platform shown in FIG. 10 around the A-axis while a cutting tool shown in FIG. 12 remains at a fixed angle around the B-axis.
Figure 24:
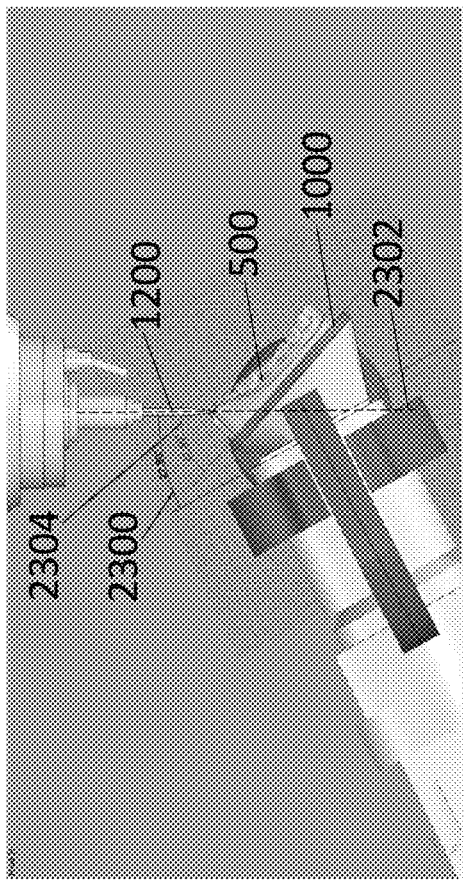
FIG. 24 illustrates rotation of the wedge-shaped platform shown in FIG. 10 around the A-axis while a cutting tool shown in FIG. 12 remains at a fixed angle around the B-axis.
Figure 25:
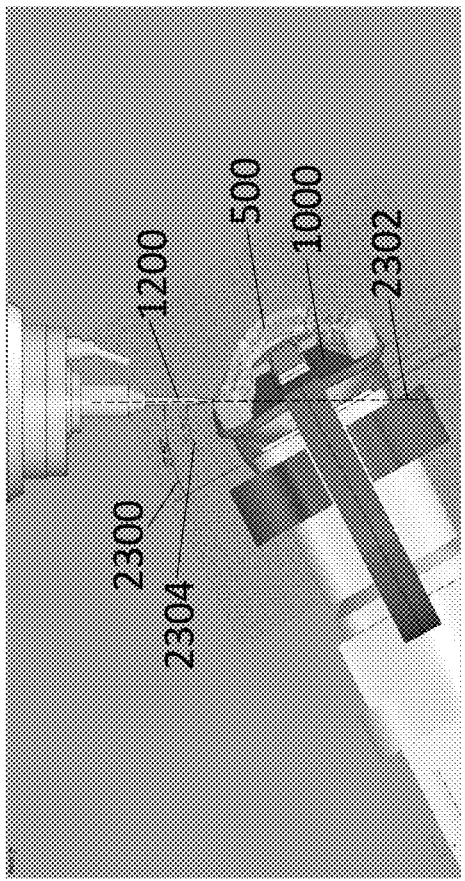
FIG. 25 illustrates rotation of the wedge-shaped platform shown in FIG. 10 around the A-axis while a cutting tool shown in FIG. 12 remains at a fixed angle around the B-axis.
Figure 26:
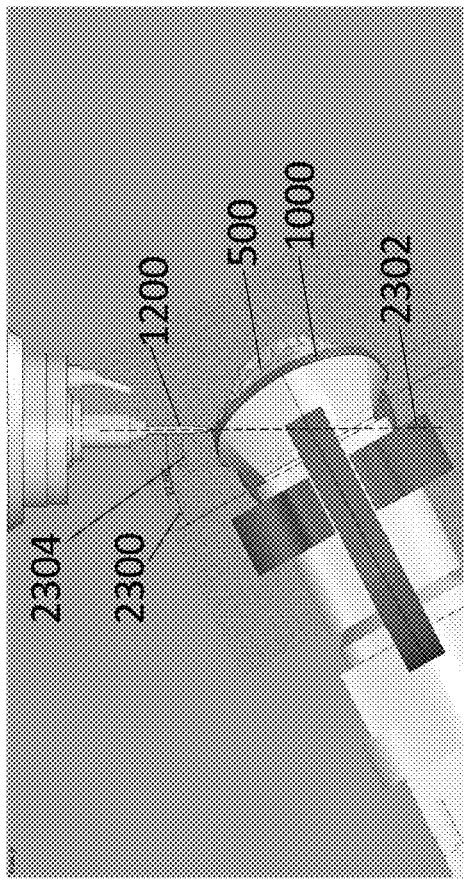
FIG. 26 illustrates rotation of the wedge-shaped platform shown in FIG. 10 around the A-axis while a cutting tool shown in FIG. 12 remains at a fixed angle around the B-axis.

As shown in FIG. 23, the platform 1000 and physical model 500 are not rotated around the A-axis 1403 (e.g., the platform 1000 and physical model 500 are at zero degrees around the A-axis 1403). At this position, the angle 2300 between the cutting tool 1200 and the bottom surface 1006 of the platform 1000 and the cutting angle 2304 are each 27.5 degrees. But, when the platform 1000 and physical model 500 are rotated around the A-axis 1403 by ninety degrees (shown in FIG. 24) to cut in the anterior region of the physical model 500, the cutting angle 2304 is reduced (e.g., changes to 7.5 degrees) while the angle 2300 between the cutting tool 1200 and the bottom surface 1006 of the platform 1000 remains at 27.5 degrees. When the platform 1000 and physical model 500 are rotated around the A-axis 1403 by one hundred eighty degrees (shown in FIG. 25), the cutting angle 2304 is increased (e.g., changes to 27.5 degrees) while the angle 2300 between the cutting tool 1200 and the bottom surface 1006 of the platform 1000 remains at 27.5 degrees. When the platform 1000 and physical model 500 are rotated around the A-axis 1403 by two hundred seventy degrees (shown in FIG. 26) to cut in the posterior region of the physical model 500, the cutting angle 2304 is increased (e.g., changes to 47.5 degrees) while the angle 2300 between the cutting tool 1200 and the bottom surface 1006 of the platform 1000 remains at 27.5 degrees. Alternatively, the angles 2300, 2304 may vary or otherwise be different from these examples.

Figure 20:
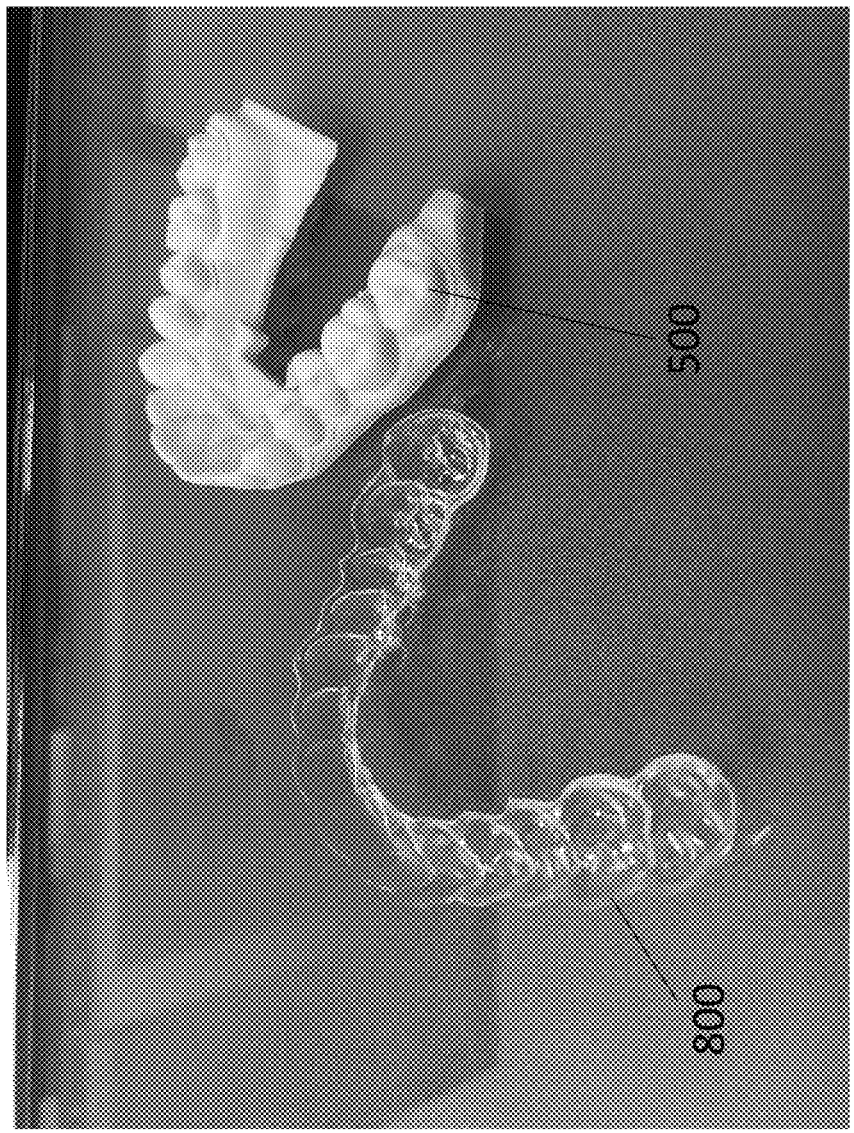
FIG. 20 illustrates the dental aligner device separated from the extraneous material and with the physical model removed.

FIG. 20 illustrates the dental aligner device 800 separated from the extraneous material 802 and with the physical model 500 removed. After separating the dental aligner device 800 from the extraneous material 802, the physical model 500 can be removed from the dental aligner device 800. As shown, the remaining dental aligner device 800 is sized and shaped to fit around the teeth of the person with the extraneous material 802 removed. The dental aligner device 800 can then be cleaned (if needed) or otherwise treated to remove burrs or other rough edges from along the user-defined path 1300. The dental aligner device 800 can then be inserted into and used in a person's mouth to change the positions of the person's teeth.

Figure 21:
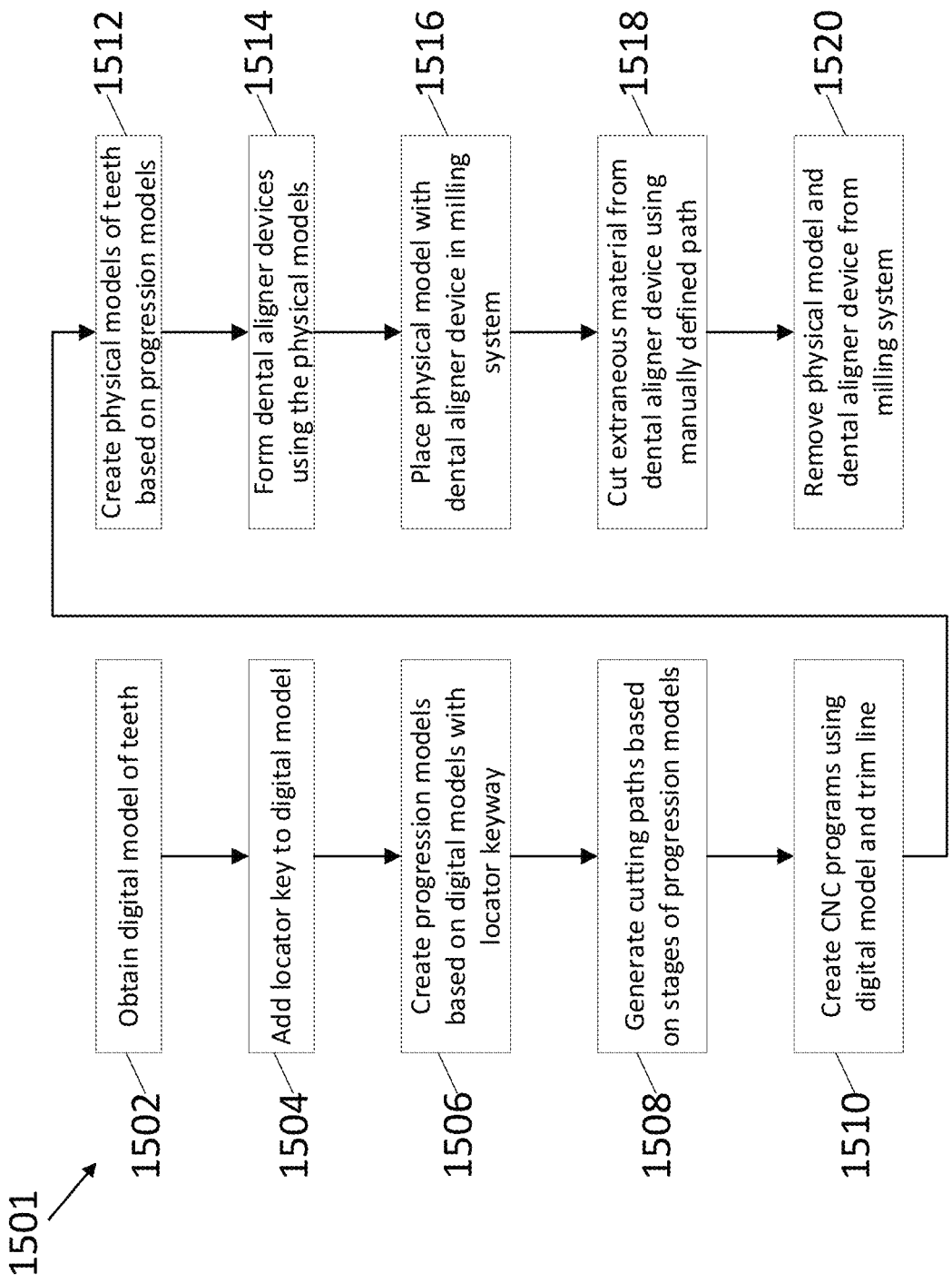
FIG. 21 illustrates a flowchart of one embodiment of a method for manufacturing a dental aligner device.

FIG. 21 illustrates a flowchart of one embodiment of a method 1501 for manufacturing a dental aligner device. The method 1501 can represent the operations performed by various components of the manufacturing system 100 to create a dental aligner device 800. At 1502, a digital model of a set of teeth is obtained. For example, the digital model 202 of a person's teeth can be obtained from x-rays, 3D laser scans, intra-oral scanner, impressions, or the like. At 1504, the digital model of the teeth is modified by combining a locator keyway with the digital model. This modification creates a modified digital model of the teeth. The modified digital model can include the locator keyway at least partially extending out of or into the original digital model of the teeth.

At 1506, a set of progression digital models of the teeth are created. As described above, the progression digital models represent different locations of teeth during a progression in changing the locations of the teeth. The set of progression digital models can be created based off the modified digital model of the teeth so that the locator keyway is located in the same location throughout the progression digital models in the set associated with the same set of teeth for the same person.

At 1508, trim lines (cutting paths) are generated based on stages (e.g., each stage) of the progression digital models in the set. The trim lines may be generated automatically by the treatment planning system. The automatically generated trimlines may be manually modified by the user if required or desired. Any additional manual changes made to the trimline can be applied to each or several of the stages of the progression, taking the changing positions of the teeth in each stage into account. Alternatively, the trimlines may be generated manually using a separate CAD system. In either case the trim lines will be output in a digital format which along with the digital model of the teeth will serve as the input to the CAM system 102. Optionally, the cutting path can be manually established earlier or later in the method 1500.

At 1510, the CAM system 102 generates one or more computer numerical control (CNC) programs using the digital model of the teeth and the trim line. The CNC programs may be ready for input to the milling system 114. The CAM 102 system may be standalone, that is, it will be situated in the same facility as the CAD system 108 and the milling system 114. Alternatively, the CAM system 102 may be located remotely as a cloud service and accessed via the internet.

At 1512, physical models of the teeth are created. The physical models can be created by 3D printing bodies that replicate or represent the progression digital models of the teeth and soft tissue. The physical models are created based on the progression digital models such that the physical models include the locator keyway. At 1514, dental aligner devices are formed using the physical models of the teeth and soft tissue. In one embodiment, several dental aligner devices are formed by thermoforming polymer sheets onto each of the different physical models created at 1508. The physical models can be placed onto a platform of a thermoforming machine (e.g., the forming system 112) by mating the locator keyway formed in the physical models with a locator key projecting from the platform of the thermoforming machine. The formed dental aligner devices can have extraneous material extending away from the physical model, as well as a void formed between the teeth of the physical models where the locator key was located during thermoforming.

At 1516, a physical model with the dental aligner device and extraneous material are placed into a milling machine. For example, the dental aligner device with the physical model coupled with the dental aligner device and the extraneous material projecting from the dental aligner device are placed onto a platform of the milling system 114. This platform may include a platform key that mates with the locator keyway to hold the dental aligner device and physical model during milling.

At 1518, the milling system cuts the extraneous material from the dental aligner device along the user-defined cutting path. The milling system can cut the extraneous material from the dental aligner device by rotating the physical model with the dental aligner device around an axis while keeping the angle between the milling or cutting tool and the axis constant. This removes the extraneous material from the dental aligner device. At 1520, the physical model is removed from the dental aligner device. The dental aligner device with the physical model and the extraneous material removed may then be cleaned or otherwise processed to remove burrs and rough edges from the dental aligner device. The dental aligner device can then be inserted into the mouth of the person on which the models are based to change alignment of the teeth of that person.

In one embodiment, a method includes obtaining a first digital model of teeth, creating a modified digital model of the teeth by adding a locator feature to the first digital model of the teeth, and creating a physical model of the teeth based on the modified digital model. A portion of the physical model is created based on the locator feature. The method also includes forming a dental aligner device on the physical model of the teeth with extraneous material of the dental aligner device extending away from the dental aligner device and removing the extraneous material from the dental aligner device from the physical model of the teeth. One or more of forming the dental aligner device or removing the extraneous material is performed by positioning the physical model during the forming the dental aligner device and/or removing the extraneous material using the locator feature.

Optionally, the method also includes creating a set of progression digital models based on the modified digital model of the teeth and the locator feature. The set can include two or more of the progression digital models having the teeth in different locations. The locator feature can be added to the first digital model of the teeth prior to the set of the progression digital models being created.

Optionally, the method also includes creating a set of progression digital models based on the modified digital model of the teeth and the locator feature. The set can include two or more of the progression digital models having the teeth in different locations. The locator feature can be added to the first digital model of the teeth after the set of the progression digital models is created.

Optionally, the method also includes creating a set of progression digital models of the teeth based on the modified digital model of the teeth having the locator feature. The set of the progression digital models can define changes in locations of one or more of the teeth. The set of the progression digital models can be created such that the locator feature is present in a common location in the progression digital models in the set.

Optionally, the physical model of the teeth is created by 3D printing of the physical model based on at least one of the progression digital models of the teeth.

Optionally, the physical model of the teeth is created based on at least one of the progression digital models having the locator feature such that the physical model includes the locator feature.

Optionally, the locator feature is a positive locator keyway representing a body that protrudes from the modified digital model of the teeth.

Optionally, the locator feature is a negative locator keyway representing a void that extends into the modified digital model of the teeth.

Optionally, the locator feature is a hybrid locator keyway representing both a body that protrudes from the modified digital model of the teeth and a void that extends into the modified digital model of the teeth.

Optionally, the first digital model of the teeth is obtained from one or more of an image of the teeth, an x-ray of the teeth, a 3D scan of an impression of the teeth, a three-dimensional intra-oral scan of the teeth, and/or a bite registration of the teeth.

Optionally, the first digital model of the teeth that is obtained represents locations of the teeth prior to changing the locations of the teeth using the dental aligner device.

Optionally, adding the locator feature to the first digital model includes combining the locator feature and the first digital model to create the modified digital model of the teeth.

Optionally, the dental aligner device is formed on the physical model by thermoforming a sheet of material on the physical model.

Optionally, the dental aligner device is formed on the physical model having the locator feature such that the extraneous material extending away from the dental aligner device includes a shape of the locator feature.

Optionally, the dental aligner device is formed on the physical model having the locator feature by mating the locator feature in the physical model on a complimentary-shaped locator key in a forming system.

Optionally, the extraneous material is removed from the dental aligner device by milling the extraneous material from the dental aligner device.

Optionally, the extraneous material is removed from the dental aligner device by mating the locator feature in the physical model on a complimentary-shaped locator key in a milling system.

Optionally, the extraneous material is removed from the dental aligner device by obtaining a manually or automatically created cutting path and cutting the extraneous material along the created cutting path.

Optionally, the method also includes creating a set of progression digital models of the teeth based on the modified digital model of the teeth having the locator feature, the set of the progression digital models defining changes in locations of one or more of the teeth. Creating the physical model of the teeth can include creating a plurality of the physical models based on two or more of the progression digital models. Forming the dental aligner device can include forming a plurality of the dental aligner device for each of two or more of the progression digital models. The method also can include obtaining a manually or automatically created cutting path using one or more of the modified digital model or at least one of the progression digital models. The extraneous material can be removed from the dental aligner device by automatically cutting the extraneous material along the created cutting path. The same created cutting path can be used to remove the extraneous material from two or more of the dental aligner devices formed on two or more of the progression digital models.

Optionally, the extraneous material is removed from the dental aligner device by rotating the dental aligner device around a first axis while a milling tool rotates around a tool axis cuts the extraneous material from the dental aligner device and maintains a constant angle between the tool axis and the first axis.

In one embodiment, a manufacturing system includes one or more processors configured to obtain a first digital model of teeth and to create a modified digital model of the teeth by adding a locator feature to the first digital model of the teeth and a printing system configured to create a physical model of the teeth based on the modified digital model. A portion of the physical model is created based on the locator feature. The manufacturing system also includes a forming system configured to form a dental aligner device on the physical model of the teeth with extraneous material of the dental aligner device extending away from the dental aligner device and a milling system configured to remove the extraneous material from the dental aligner device from the physical model of the teeth. One or more of the forming system forms the dental aligner device or the milling system removes the extraneous material by positioning the physical model using the locator feature.

Optionally, the one or more processors are configured to create a set of progression digital models based on the modified digital model of the teeth and the locator feature. The set can include two or more of the progression digital models having the teeth in different locations. The locator feature can be added to the first digital model of the teeth prior to the set of the progression digital models being created.

Optionally, the one or more processors are configured to create a set of progression digital models based on the modified digital model of the teeth and the locator feature. The set can include two or more of the progression digital models having the teeth in different locations. The locator feature can be added to the first digital model of the teeth after the set of the progression digital models is created.

Optionally, the one or more processors are configured to create a set of progression digital models of the teeth based on the modified digital model of the teeth having the locator feature. The set of the progression digital models can define changes in locations of one or more of the teeth. The set of the progression digital models can be created such that the locator feature is present in a common location in the progression digital models in the set.

Optionally, the printing system is a 3D printing system configured to print the physical model based on at least one of the progression digital models of the teeth.

Optionally, the printing system creates the physical model of the teeth based on at least one of the progression digital models having the locator feature such that the physical model includes the locator feature.

Optionally, the locator feature is a positive locator keyway representing a body that protrudes from the modified digital model of the teeth.

Optionally, the locator feature is a negative locator keyway representing a void that extends into the modified digital model of the teeth.

Optionally, the locator feature is a hybrid locator keyway representing both a body that protrudes from the modified digital model of the teeth and a void that extends into the modified digital model of the teeth.

Optionally, the one or more processors are configured to obtain the first digital model of the teeth from one or more of an image of the teeth, an x-ray of the teeth, a 3D scan of an impression of the teeth, a three-dimensional intra-oral scan of the teeth, and/or a bite registration of the teeth.

Optionally, the one or more processors are configured to obtain the first digital model of the teeth that represents locations of the teeth prior to changing the locations of the teeth using the dental aligner device.

Optionally, the one or more processors are configured to add the locator feature to the first digital model by combining the locator feature and the first digital model to create the modified digital model of the teeth.

Optionally, the forming system is a thermoforming system that creates the dental aligner device by thermoforming a sheet of material on the physical model.

Optionally, the forming system is configured to create the dental aligner device on the physical model having the locator feature such that the extraneous material extending away from the dental aligner device includes a shape of the locator feature.

Optionally, the forming system is configured to create the dental aligner device on the physical model having the locator feature by mating the locator feature in the physical model on a complimentary-shaped locator key in a forming system.

Optionally, the milling system is configured to remove the extraneous material from the dental aligner device after mating the locator feature in the physical model on a complimentary-shaped locator key in a milling system.

Optionally, the milling system is configured to remove the extraneous material from the dental aligner device by obtaining a manually or automatically created cutting path and cutting the extraneous material along the created cutting path.

Optionally, the one or more processors are configured to create a set of progression digital models of the teeth based on the modified digital model of the teeth having the locator feature. The set of the progression digital models can define changes in locations of one or more of the teeth. The printing system can be configured to create the physical model of the teeth by creating a plurality of the physical models based on two or more of the progression digital models. The forming system can be configured to form the dental aligner device by forming a plurality of the dental aligner device for each of two or more of the progression digital models. The one or more processors can be configured to obtain a manually or automatically created cutting path using one or more of the modified digital models or at least one of the progression digital models. The milling system can be configured to remove the extraneous material from the dental aligner device by automatically cutting the extraneous material along the created cutting path. The milling system can be configured to use the same created cutting path to remove the extraneous material from two or more of the dental aligner devices formed on two or more of the progression digital models.

Optionally, the milling system is configured to remove the extraneous material from the dental aligner device by rotating the dental aligner device around a first axis while a milling tool rotates around a tool axis cuts the extraneous material from the dental aligner device and maintains a constant angle between the tool axis and the first axis.

In one embodiment, a manufacturing system includes a CAD system configured to obtain a digital model of teeth. The CAD system is configured to add a locator feature to the digital model of the teeth. The manufacturing system also includes a 3D printing system configured to create a physical model of the teeth based on the digital model having the locator feature, a thermoforming system configured to form a dental aligner device on the physical model of the teeth with extraneous material of the dental aligner device extending away from the dental aligner device, and a milling system configured to remove the extraneous material from the dental aligner device from the physical model of the teeth. One or more of the thermoforming system is configured to form the dental aligner device or the milling system is configured to remove the extraneous material is performed by positioning the physical model during one or more of forming the dental aligner device or removing the extraneous material using the locator feature.

Optionally, the manufacturing system also includes a CAM system configured to receive user input to manually define a cutting path. The CAM system can be configured to provide the cutting path to the milling system.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   obtaining a first digital model of teeth;
   creating a modified digital model of the teeth by adding a locator feature to the first digital model of the teeth;
   creating a physical model of the teeth based on the modified digital model, wherein a portion of the physical model is created based on the locator feature;
   forming a dental aligner device on the physical model of the teeth with extraneous material of the dental aligner device extending away from the dental aligner device; and
   removing the extraneous material from the dental aligner device, and removing from the physical model of the teeth from the dental aligner device,
   wherein one or more of forming the dental aligner device or removing the extraneous material is performed by positioning the physical model during one or more of forming the dental aligner device or removing the extraneous material using the locator feature, wherein the dental aligner device is formed on the physical model having the locator feature such that the extraneous material extending away from the dental aligner device includes a shape of the locator feature.

2. The method of claim 1, further comprising:
   creating a set of progression digital models based on the modified digital model of the teeth and the locator feature, the set including two or more of the progression digital models having the teeth in different locations, wherein the locator feature is added to the first digital model of the teeth prior to the set of the progression digital models is created or after the set of the progression digital models is created.

3. The method of claim 1, further comprising:
   creating a set of progression digital models of the teeth based on the modified digital model of the teeth having the locator feature, the set of the progression digital models defining changes in locations of one or more of the teeth,
   wherein the set of the progression digital models is created such that the locator feature is present in a common location in the progression digital models in the set.

4. The method of claim 1, wherein the locator feature is a positive locator keyway representing a body that protrudes from the modified digital model of the teeth or a negative locator keyway representing a void that extends into the modified digital model of the teeth.

5. The method of claim 1, wherein the extraneous material is removed from the dental aligner device by mating the locator feature in the physical model on a complimentary-shaped locator key in a milling system.

6. The method of claim 1, wherein the extraneous material is removed from the dental aligner device by obtaining a manually or automatically created cutting path and cutting the extraneous material along the created cutting path.

7. The method of claim 6, wherein the cutting path is obtained by scanning a unique identifier printed on the physical model and downloading the cutting path from one or more servers via one or more computer networks.

8. The method of claim 1, wherein the extraneous material is removed from the dental aligner device by rotating the dental aligner device around a first axis while a cutting tool rotates around a tool axis cuts the extraneous material from the dental aligner device and maintains a constant angle between the tool axis and the first axis.

9. The method of claim 8, wherein the extraneous material is removed from the dental aligner device by securing the dental aligner device onto a wedge-shaped platform and rotating the wedge-shaped platform while the cutting tool cuts the extraneous material.

10. The method of claim 1, wherein one or more of forming the dental aligner device on the physical model of the teeth or removing the extraneous material from the dental aligner device is performed while securing the dental aligner device to a platform using suction.

11. A method comprising:
    obtaining a first digital model of teeth;
    creating a modified digital model of the teeth by adding a locator feature to the first digital model of the teeth;
    creating a physical model of the teeth based on the modified digital model, wherein a portion of the physical model is created based on the locator feature;
    forming a dental aligner device on the physical model of the teeth with extraneous material of the dental aligner device extending away from the dental aligner device; and
    removing the extraneous material from the dental aligner device, and removing from the physical model of the teeth from the dental aligner device,
    wherein one or more of forming the dental aligner device or removing the extraneous material is performed by positioning the physical model during one or more of forming the dental aligner device or removing the extraneous material using the locator feature, wherein the extraneous material is removed from the dental aligner device by rotating the dental aligner device around a first axis while a cutting tool rotates around a tool axis cuts the extraneous material from the dental aligner device and maintains a constant angle between the tool axis and the first axis,
    wherein the extraneous material is removed from the dental aligner device by securing the dental aligner device onto a wedge-shaped platform and rotating the wedge-shaped platform while the cutting tool cuts the extraneous material.

12. The method of claim 11, further comprising:
    creating a set of progression digital models based on the modified digital model of the teeth and the locator feature, the set including two or more of the progression digital models having the teeth in different locations, wherein the locator feature is added to the first digital model of the teeth prior to the set of the progression digital models is created or after the set of the progression digital models is created.

13. The method of claim 11, further comprising:
    creating a set of progression digital models of the teeth based on the modified digital model of the teeth having the locator feature, the set of the progression digital models defining changes in locations of one or more of the teeth,
    wherein the set of the progression digital models is created such that the locator feature is present in a common location in the progression digital models in the set.

14. The method of claim 11, wherein the locator feature is a positive locator keyway representing a body that protrudes from the modified digital model of the teeth or a negative locator keyway representing a void that extends into the modified digital model of the teeth.

15. The method of claim 11, wherein the dental aligner device is formed on the physical model having the locator feature such that the extraneous material extending away from the dental aligner device includes a shape of the locator feature.

16. The method of claim 11, wherein the extraneous material is removed from the dental aligner device by mating the locator feature in the physical model on a complimentary-shaped locator key in a milling system.

17. The method of claim 11, wherein the extraneous material is removed from the dental aligner device by obtaining a manually or automatically created cutting path and cutting the extraneous material along the created cutting path.

18. The method of claim 17, wherein the cutting path is obtained by scanning a unique identifier printed on the physical model and downloading the cutting path from one or more servers via one or more computer networks.

19. The method of claim 11, wherein one or more of forming the dental aligner device on the physical model of the teeth or removing the extraneous material from the dental aligner device is performed while securing the dental aligner device to a platform using suction.

* * * * *